United States Patent [19]
Yamakawa et al.

[11] Patent Number: 5,402,283
[45] Date of Patent: Mar. 28, 1995

[54] RECORDING MEDIUM CARTRIDGE HANDLING MECHANISM IN LIBRARY APPARATUS

[75] Inventors: Kengo Yamakawa, Kawasaki; Hiroshi Shibuya, Yokohama; Hiroyuki Sugihara, Kawasaki; Hidenori Maeda, Tokyo; Kohjiroh Hashimoto, Kawasaki, all of Japan

[73] Assignees: Fujitsu Limited, Kawasaki; Copal Company Limited, Tokyo, both of Japan

[21] Appl. No.: 60,351

[22] Filed: May 11, 1993

[30] Foreign Application Priority Data

| May 21, 1992 | [JP] | Japan | 4-128814 |
| Jun. 5, 1992 | [JP] | Japan | 4-145430 |
| Jun. 5, 1992 | [JP] | Japan | 4-145432 |
| Jan. 29, 1993 | [JP] | Japan | 5-013535 |

[51] Int. Cl.⁶ ............................ G11B 15/68
[52] U.S. Cl. ........................................ 360/92
[58] Field of Search ................................ 360/92

[56] References Cited

U.S. PATENT DOCUMENTS

| 3,747,939 | 7/1973 | Iwasaki | 360/92 |
| 4,271,440 | 6/1981 | Jenkins et al. | 360/92 |
| 4,275,425 | 6/1981 | Watanabe et al. | 360/92 |
| 4,918,548 | 4/1990 | O'Donnell et al. | 360/92 |
| 4,991,041 | 2/1991 | Grant | 360/92 |

FOREIGN PATENT DOCUMENTS

| 63-298857 | 12/1988 | Japan . |
| 1-146157 | 6/1989 | Japan . |
| 3-209663 | 9/1991 | Japan . |
| 3-259451 | 11/1991 | Japan . |
| 3-260951 | 11/1991 | Japan . |
| 3-121547 | 12/1991 | Japan . |
| 5-135459 | 6/1993 | Japan ............... 360/92 |

*Primary Examiner*—John H. Wolff
*Attorney, Agent, or Firm*—Greer, Burns & Crain, Ltd.

[57] ABSTRACT

A hand mechanism of an accessor, capable of gripping a recording medium cartridge in a horizontal condition thereof. The accessor automatically exchanges the recording medium cartridge between a cell unit having a plurality of cells each accommodating the recording medium cartridge and a recording medium drive unit for performing read/write of data from/to the recording medium cartridge. The hand mechanism includes a base mounted swingably about a vertical axis, a grip hand mounted on the base movably between an advanced position and a retracted position, for gripping the cartridge, and a tray mounted on the base and under the grip hand movably between an advanced position projecting from the base and a retracted position. The hand mechanism further includes a cartridge gripped condition correcting mechanism for correcting a gripped condition of the cartridge gripped by the grip hand.

16 Claims, 33 Drawing Sheets

RECORDING MEDIUM CARTRIDGE HANDLING MECHANISM IN LIBRARY APPARATUS

BACKGROUND OF THE INVENTION

1. Field of the Invention

The present invention relates generally to a recording medium handling mechanism in a library apparatus, and more particularly to a mechanical hand of an accessor for automatically exchanging a recording medium cartridge between a cell unit for accommodating the cartridge and a recording medium drive unit for performing read/write of data from/to the cartridge.

2. Description of the Related Art

A magnetic tape unit is known as an example of an external storage for a computer. An open-reel type magnetic tape unit using a 0.5-inch-wide tape is used in the art, but the operation is troublesome. So, there use is spreading of an automatic threading unit capable of automatically threading a tape by setting a reel on a support plate. Further, a magnetic tape cartridge has recently been used widely for the purpose of reducing a burden of an operator. In the magnetic tape cartridge, a tape of the same width as that of the open-reel type magnetic tape unit is used, and the tape is automatically drawn and threaded from a reel accommodated in a case.

A required number of such magnetic tape cartridges are entered in a magnetic tape library apparatus, and are selectively loaded to perform read/write of data. The magnetic tape library apparatus includes a cell unit having a plurality of cells for accommodating the magnetic tape cartridges, a magnetic tape drive unit for performing read/write of data from/to the selected magnetic tape cartridge, and an accessor for automatically exchanging the magnetic tape cartridge between the cell unit and the magnetic tape drive unit.

The magnetic tape library apparatus further includes a cartridge entry unit for entering the magnetic tape cartridges into the library apparatus and an automatic cartridge exit unit for automatically ejecting the magnetic tape cartridges from the library apparatus. Such a magnetic tape library apparatus has recently been used as a mass external storage for a computer, and it is required to reliably operate even when unmanned.

The accessor is provided with a hand mechanism for gripping the magnetic tape cartridge. The accessor serves to deliver the magnetic tape cartridge gripped by the mechanical hand among the cell unit, the magnetic tape drive unit, the cartridge entry unit and the automatic cartridge exit unit. The mechanical hand in the prior art includes a grip hand constructed of an upper finger and a lower finger. The lower finger is mounted pivotably about a horizontal axis. That is, the lower finger is adapted to be vertically opened and closed to grip and release the cartridge.

In such a conventional mechanical hand, the lower finger is opened in the cell accommodating the magnetic tape cartridge, so that it is necessary to define a space for permitting movement of the lower finger in the cell. Accordingly, a height of the cell must be made large. Further, as a cartridge insert opening of the magnetic tape drive unit is smaller in size than that of the cell, it is necessary to provide an automatic loading unit before the cartridge insert opening of the magnetic tape drive unit, so as to surely insert the cartridge. Accordingly, the magnetic tape library apparatus becomes large in size, and a cost increase is caused.

SUMMARY OF THE INVENTION

It is therefore an object of the present invention to provide a mechanical hand of an accessor provided in a library apparatus, which can directly insert a recording medium cartridge into a recording medium drive unit.

It is another object of the present invention to provide a mechanical hand of an accessor, which can save a space for a cell unit for accommodating recording medium cartridges.

It is still another object of the present invention to provide a mechanical hand of an accessor, which can prevent that a recording medium cartridge will fly from a tray during a receiving operation of the cartridge into the mechanical hand, and can grip the cartridge with a correct attitude.

In accordance with an aspect of the present invention, there is provided a mechanical hand of an accessor for automatically exchanging a recording medium cartridge between a cell unit having a plurality of cells each accommodating said recording medium cartridge and a recording medium drive unit for performing read/write of data from/to said recording medium cartridge, said mechanical hand comprising a base mounted swingably about a vertical axis: gripping means mounted on said base movably between an advanced position and a retracted position, for gripping said recording medium cartridge, said gripping means being adapted to be opened and closed about a vertical axis; first driving means for moving said gripping means along said base; second driving means for opening and closing said gripping means; a tray mounted on said base under said gripping means movably between an advanced position projecting from said base and a retracted position; and third driving means for moving said tray along said base.

Preferably, the gripping means comprises a pair of L-shaped fingers each mounted pivotably about a vertical axis, each finger having one end formed with a cartridge gripping portion and the other end formed with a cartridge pushing portion. The pair of L-shaped fingers are related in position so that the cartridge gripping portions form opposite outside portions of the gripping means.

According to the present invention, since the gripping means is pivotable about a vertical axis, opposite side surfaces of the cartridge can be gripped by the gripping means. Accordingly, the cartridge can be directly inserted into the recording medium drive unit, and the automatic loading unit necessary in the prior art can be eliminated. Further, since it is unnecessary to downwardly open the finger in the cell as in the prior art, the space for the cell unit can be saved.

In accordance with another aspect of the present invention, there is provided a mechanical hand of an accessor for automatically exchanging a recording medium cartridge between a cell unit having a plurality of cells each accommodating said recording medium cartridge and a recording medium drive unit for performing read/write of data from/to said recording medium cartridge, said mechanical hand comprising a base mounted swingably about a vertical axis; gripping means mounted on said base movably between an advanced position and a retracted position, for gripping said recording medium cartridge, said gripping means being adapted to be opened and closed about a vertical axis; first driving means for moving said gripping means along said base; second driving means for opening and closing said gripping means; a tray mounted on said base under said gripping means movably between an advanced position projecting from said base and a retracted position; third driving means for moving said tray along said base; a housing of said gripping means for accommodating said first and second driving means; first positioning means mounted on said base for defining a reference position of said recording medium cartridge when said gripping means is moved to said retracted position gripping said cartridge; second positioning means mounted on said base for elastically biasing said recording medium cartridge toward said first positioning means; and a block mounted on a side surface of said housing so as to extend in a moving direction of said gripping means, said block being adapted to contact said second positioning means during movement of said gripping means from said advanced position to said retracted position.

In accordance with still another aspect of the present invention, there is provided a mechanical hand of an accessor for automatically exchanging a recording medium cartridge between a cell unit having a plurality of cells each accommodating said recording medium cartridge and a recording medium drive unit for performing read/write of data from/to said recording medium cartridge, said mechanical hand comprising a base mounted swingably about a vertical axis; gripping means mounted on said base movably between an advanced position and a retracted position, for gripping said recording medium cartridge, said gripping means being adapted to be opened and closed about a vertical axis; first driving means for moving said gripping means along said base; second driving means for opening and closing said gripping means: a tray mounted on said base under said gripping means movably between an advanced position projecting from said base and a retracted position; third driving means for moving said tray along said base; and cartridge gripped condition correcting means for pressing said recording medium cartridge against said tray when said gripping means is moved to said retracted position gripping said cartridge.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
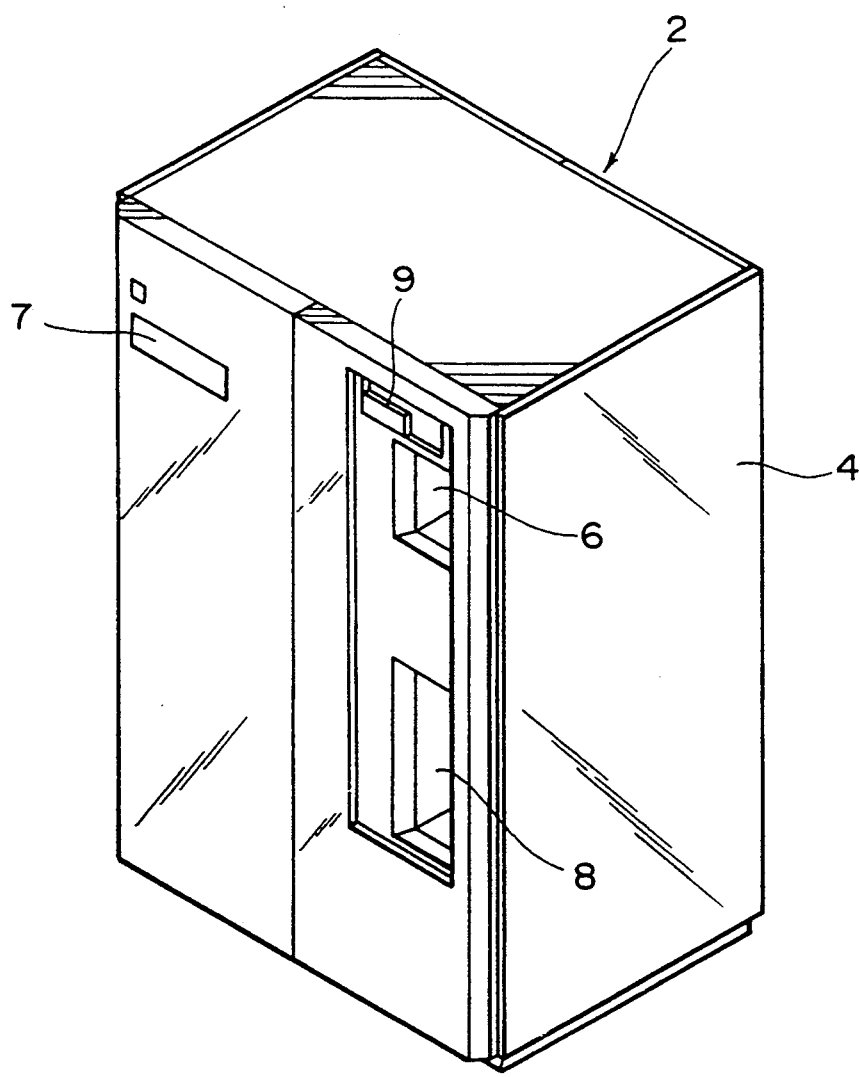
FIG. 1 is a perspective view of a magnetic tape library apparatus as viewed from a front side thereof.
Figure 2:
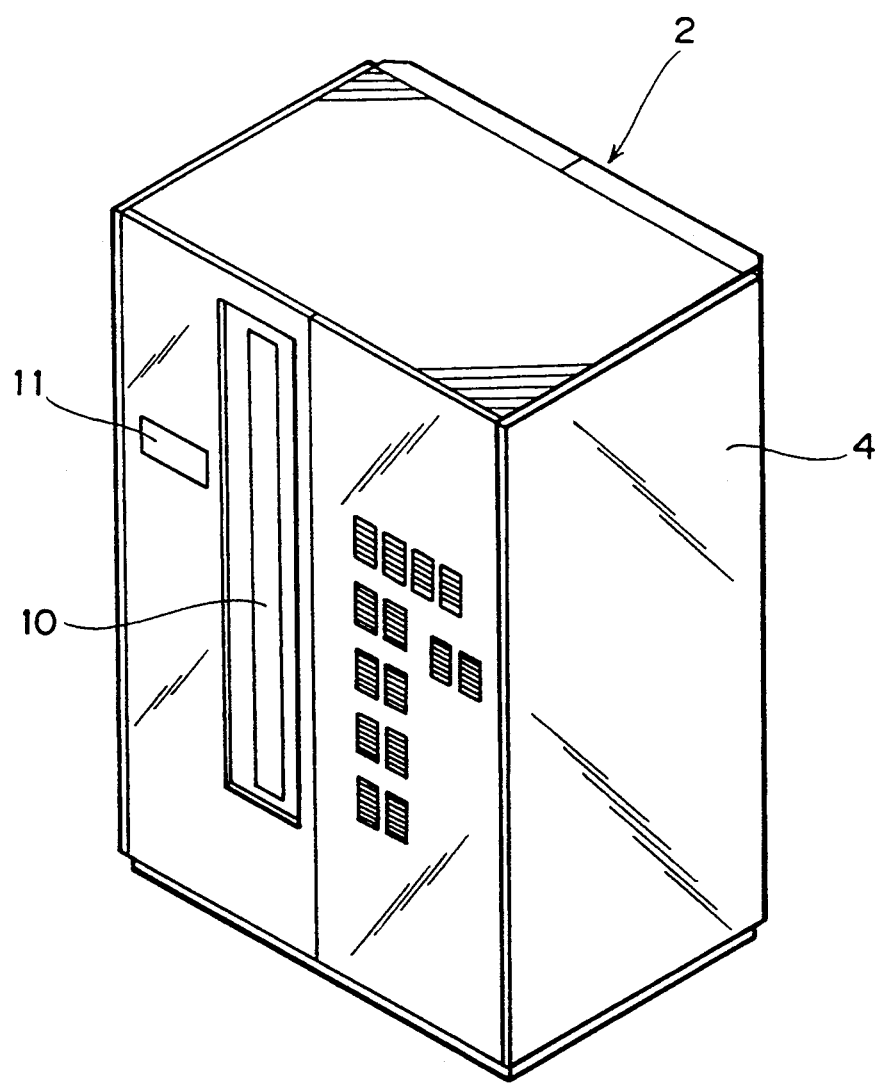
FIG. 2 is a perspective view of the magnetic tape library apparatus as viewed from a rear side thereof.

Referring now to FIGS. 1 and 2, there are shown perspective views of a magnetic tape library apparatus 2 as viewed from a front side and a rear side thereof, respectively. The magnetic tape library apparatus 2 has a housing 4. The housing 4 has a front surface formed with a cartridge entry opening 6, a cartridge exit opening 8 and an operation panel 9. For example, ten magnetic tape cartridges can be entered into the cartridge entry opening 6 at a time, and fifteen magnetic tape cartridges can be stacked in the cartridge exit opening 8 at a time. The housing 4 has a rear surface formed with a many cartridges entry/exit mechanism 10, through which a large amount of cartridges are accommodated at a time into a column of cells of a cell drum to be hereinafter described.

Figure 3:
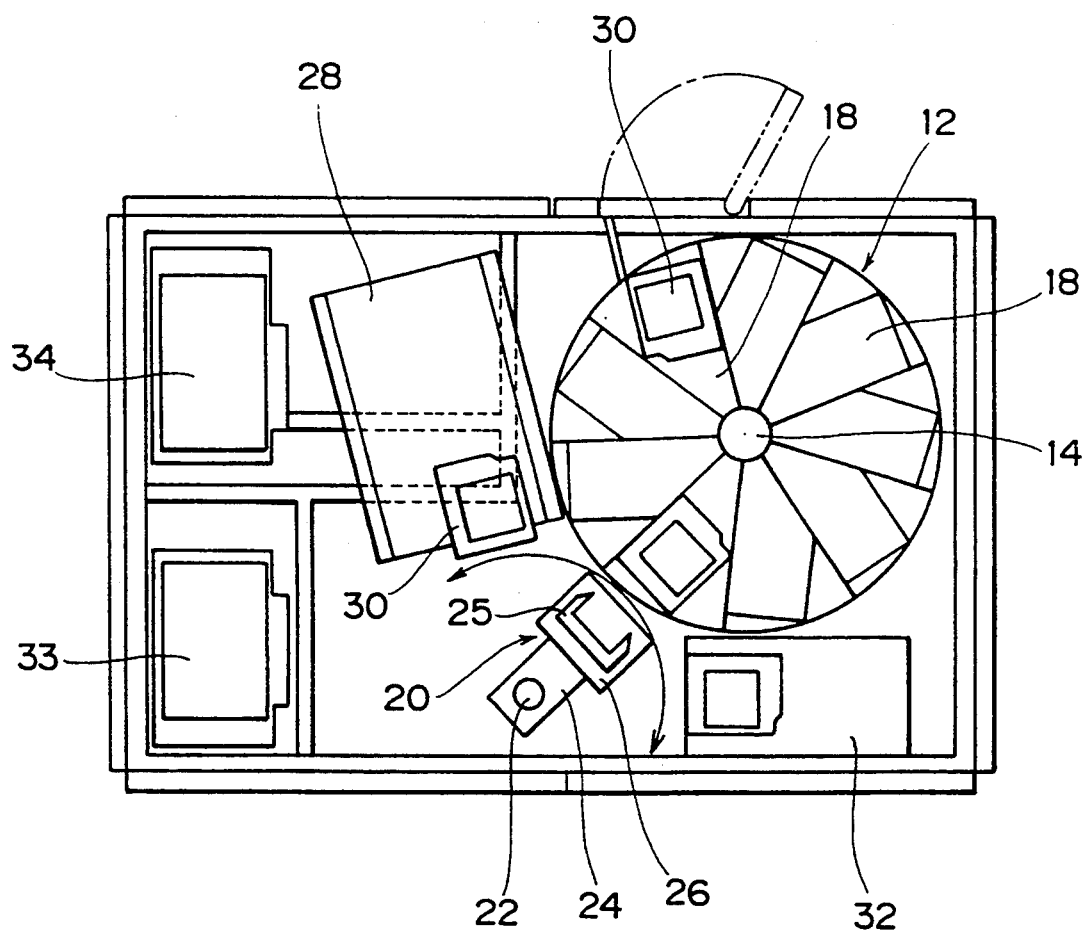
FIG. 3 is a schematic plan view of the magnetic tape library apparatus in a condition where a top plate of a housing of the library apparatus is removed.
Figure 4:
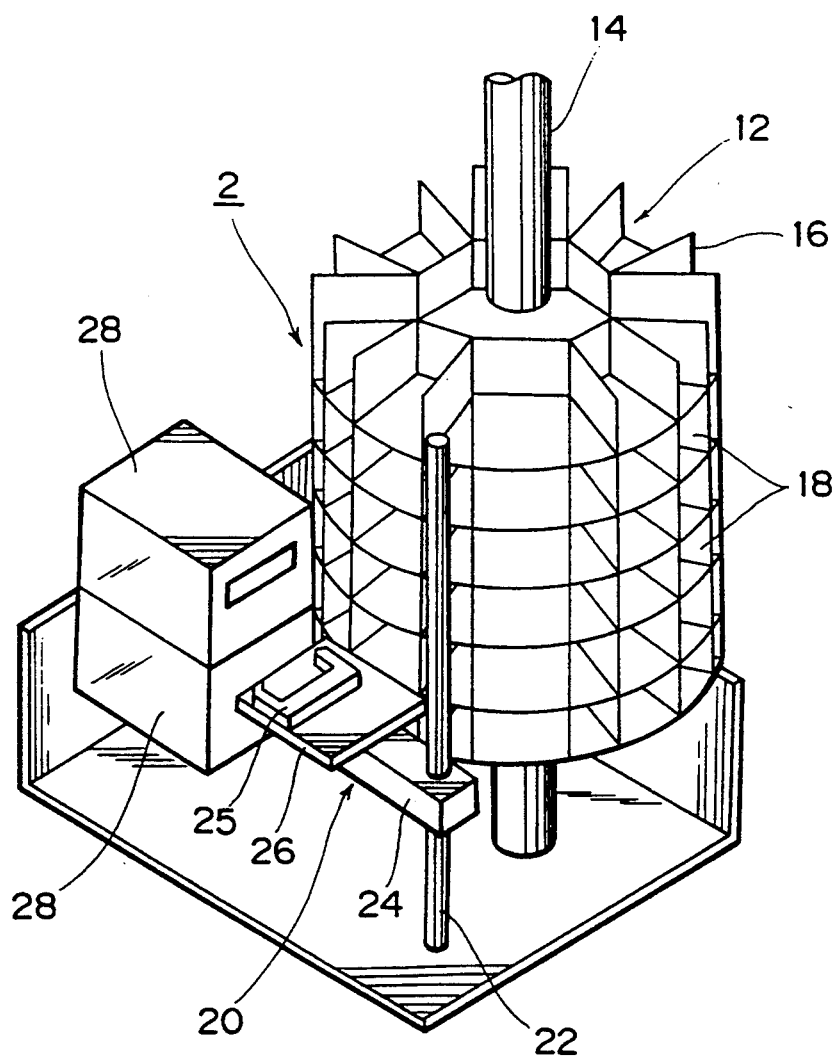
FIG. 4 is a schematic perspective view of an internal construction of the magnetic tape library apparatus.

Referring to FIGS. 3 and 4, reference numeral 12 denotes a cell drum adapted to be rotationally driven about a shaft 14. The cell drum 12 is provided with a plurality of partition walls 16 which define a plurality of cells 18. Two magnetic tape drive units 28 for recording and reproducing data to and from a magnetic tape are located adjacent to the cell drum 12. There is provided between the cell drum 12 and the magnetic tape drive units 28 an accessor 20 for automatically exchanging a magnetic tape cartridge 30 to be loaded into the selected magnetic tape drive unit 28. In FIG. 3, reference numeral 32 denotes a cartridge entry/exit mechanism communicating with the cartridge entry opening 6 and the cartridge exit opening 8 shown in FIG. 1. An accessor controller 33 is provided to control the operation of the accessor 20, the cell drum 12 and the cartridge entry/exit mechanism 32. Further, a director 34 is provided to control the recording and the reproduction of data to and from the magnetic tape cartridge 30 by the selected magnetic tape drive unit 28.

Figure 5:
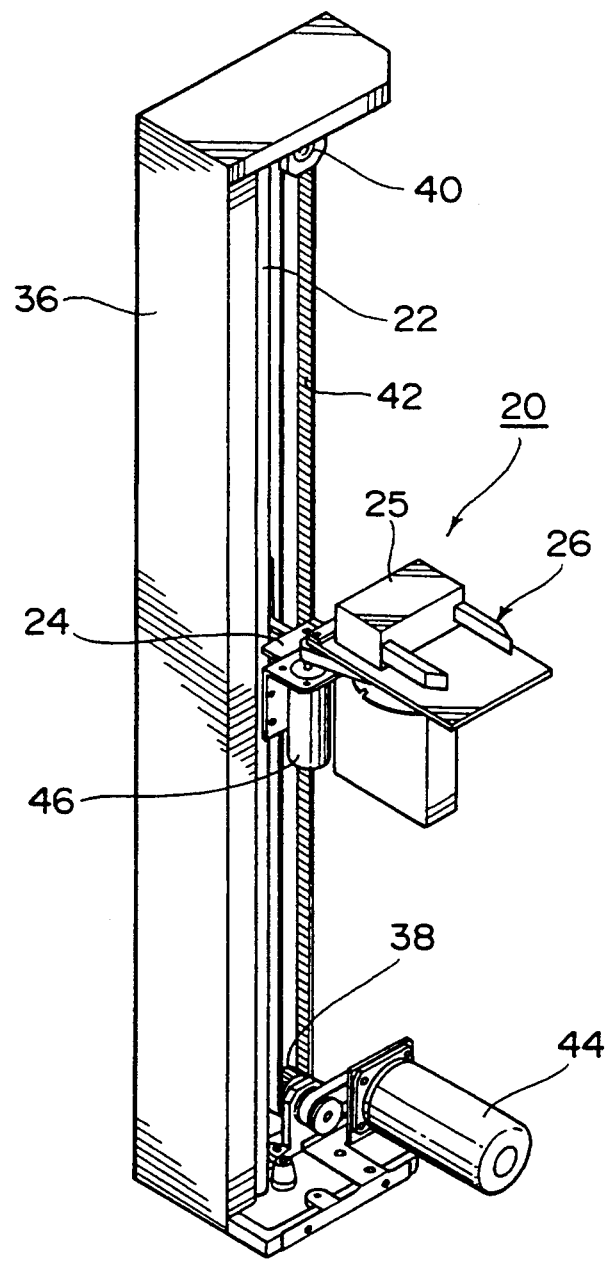
FIG. 5 is a schematic perspective view of an accessor drive mechanisms.

A drive mechanism for the accessor 20 is constructed as shown in FIG. 5. A drive pulley 38 and a driven pulley 40 are rotatably mounted to a generally C-shaped supporting member 36, and an endless timing belt 42 is wrapped around these pulleys 38 and 40. A vertically extending guide member 22 is fixed to the supporting member 36. A supporting member 24 is fixed to the timing belt 42, and one end of the supporting member 24 is engaged with the guide member 22. A mechanical hand 26 having a grip hand 25 is mounted on the supporting member 24.

When a motor 44 is driven, the supporting member 24 fixed to the timing belt 42 is vertically moved as being guided by the guide member 22. Accordingly, the mechanical hand 26 mounted on the supporting member 24 is also vertically moved. Further, when a motor 36 is driven, the supporting member 24 is swung about the guide member 22 in a horizontal plane, and the mechanical hand 26 is also swung in a horizontal plane. In this manner, the motors 44 and 46 are driven under control to thereby access the mechanical hand 26 to the selected cell 18 of the cell drum 12 or the selected magnetic tape drive unit 28.

As mentioned above, the drive mechanism for the accessor 20 is constituted of only the vertical drive mechanism and the horizontal swing mechanism about the guide member 22. Accordingly, the drive mechanism for the accessor 20 can be simplified. The cell drum 12, the magnetic tape drive units 28 and the cartridge entry/exit mechanism 32 are spatially arranged about the accessor 20 so that the cartridge 30 may be transferred among the cell drum 12, the selected magnetic tape drive unit 28 and the cartridge entry/exit mechanism 32 substantially by the swing motion only of the accessor 20 (however, the vertical motion thereof is also associated a little).

Figure 6:
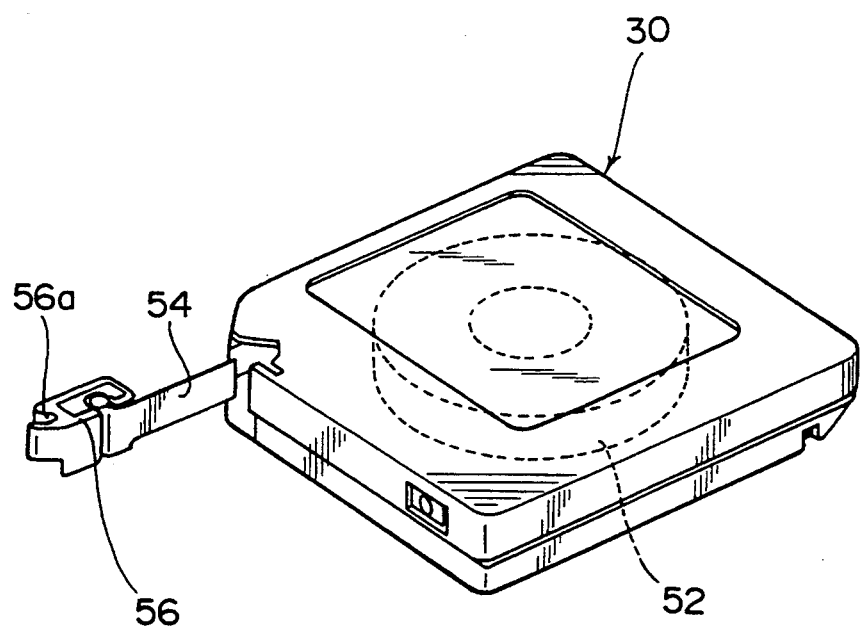
FIG. 6 is a perspective view of a magnetic tape cartridge.

Referring to FIG. 6, a tape reel 52 is rotatably provided in the magnetic tape cartridge 30. A magnetic tape 54 is fixed at an inner end thereof to the tape reel 52, and an intermediate portion of the magnetic tape 54 is wound around the tape reel 52. A leader block 56 is fixed to an outer end of the magnetic tape 54. The leader block 56 is formed with a groove 56a engageable with a sled pin (not shown) of each magnetic tape drive unit 28.

Figure 7:
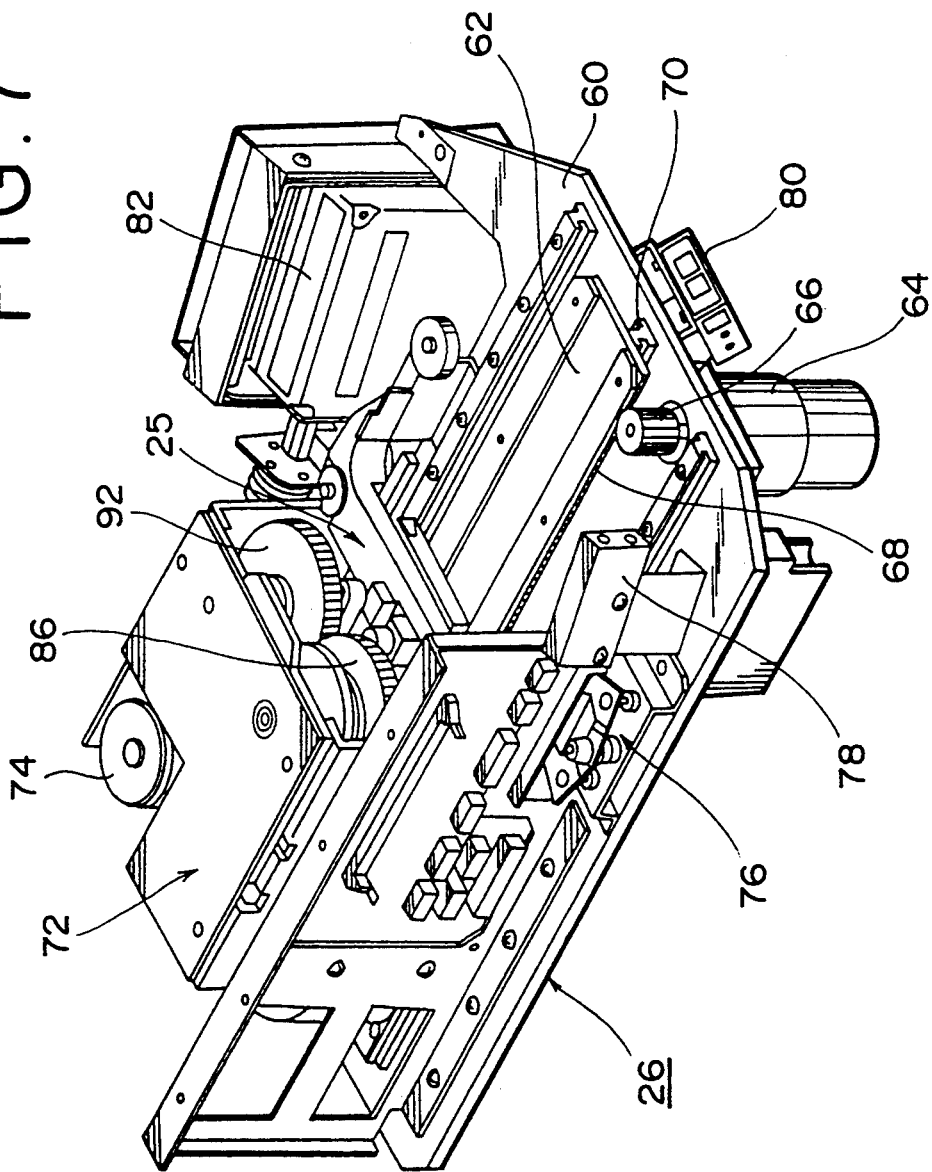
FIG. 7 is a perspective view of a hand mechanism according to a first preferred embodiment of the present invention.

Referring to FIG. 7, there will now be described the mechanical hand 26 according to a first preferred embodiment of the present invention. A tray 62 is slidably mounted on a base 60. A rack 68 is mounted on a side surface of the tray 62. The rack 68 is in mesh with a pinion 66. The pinion 66 is driven by a motor 64. Accordingly, when the motor 64 is driven, the tray 62 is moved through the pinion 66 and the rack 68 along a guide rail 70 on the base 60 between an advanced position where the tray 62 projects from the base 60 and a retracted position shown in FIG. 7. Reference numeral 72 denotes a hand unit for gripping the magnetic tape cartridge 30. The hand unit 72 is moved by a motor 74 between an advanced position and a retracted position. That is, when the motor 74 is driven, a pinion (not shown) connected to the motor 74 meshes a rack (not shown) mounted on the base 60, and the hand unit 72 is accordingly moved through the pinion and the rack between the advanced position and the retracted position.

The grip hand 25 is provided at a front end of the hand unit 72. The grip hand 25 is opened and closed between a grip position (shown in FIG. 7) where it grips the magnetic tape cartridge 30 and a release position where it release the cartridge 30, by a drive mechanism including a motor, a gear train and a coil spring to be hereinafter described. Reference numeral 78 denotes a position correcting photosensor to be used for positioning the mechanical hand 26 with respect to the cell drum 12 and the magnetic tape drive units 28. A photosensor 80 for detecting whether or not the cartridge 30 to be gripped is present or absent is located at a front end of the base 60. Further, a bar code reader 82 is mounted on the base 60 to read a bar code attached to a side surface of the magnetic tape cartridge 30 gripped by the grip hand 25.

Figure 8:
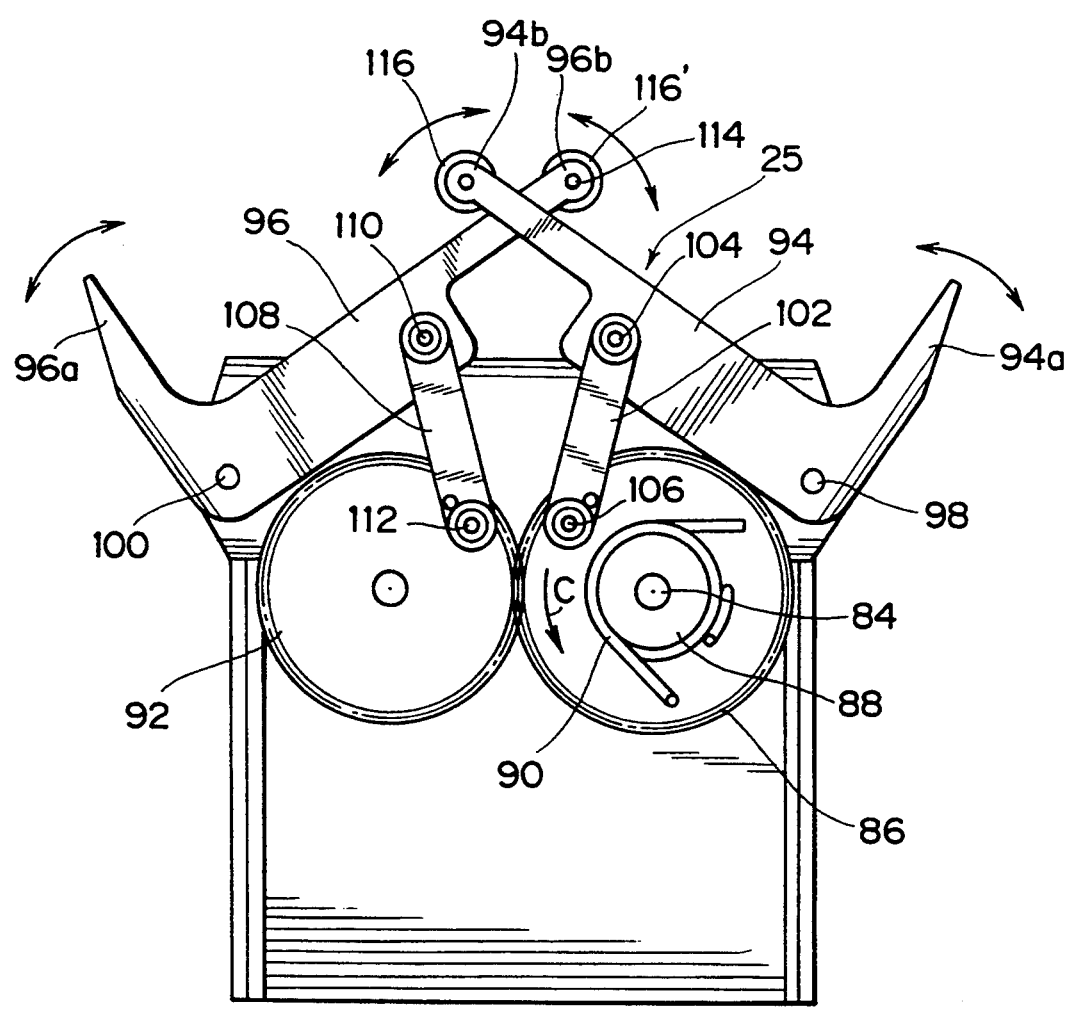
FIG. 8 is a plan view of a grip hand and a drive mechanism for the grip hand.

Referring to FIG. 8, there will be described a detailed construction of the grip hand 25 and a drive mechanism for the grip hand 25. The grip hand 25 is constructed of a first L-shaped finger 94 pivotably supported to a shaft 88 and a second L-shaped finger 96 pivotably supported to a shaft 100. The first finger 94 has a grip portion 94a at one end thereof, and a roller 116 is rotatably mounted at the other end 94b of the first finger 94. Similarly, the second finger 96 has a grip portion 96a at one end thereof, and a roller 116' is rotatably mounted at the other end 96b of the second finger 96. The first and second fingers 94 and 96 are arranged so that the grip portions 94a and 96a form a pair of outer opposite portions of the grip hand 25 and that the other ends 94b and 96b supporting the rollers 116 and 116' are disposed so as to be intersectable with each other.

A shaft 84 is operatively connected to a drive motor (not shown), and a first gear 86 and a cylindrical block 88 are fixed to the shaft 84. A coil spring 90 is mounted on the cylindrical block 88 so as to normally bias the first gear 86 in a rotational direction depicted by an arrow C. A second gear 92 is in mesh with the first gear 86. A link 102 is pivotably mounted at one end thereof to the first finger 94 by a pin 104, and the other end of the link 102 is pivotably mounted to the first gear 86 by a pin 106. Similarly, a link 108 is pivotably mounted at one end thereof to the second finger 96 by a pin 110, and the other end of the link 108 is pivotably mounted to the second gear 92 by a pin 112.

In operation, when the driving of the motor is cut off, the first gear 86 is rotated in a counterclockwise direction shown by the arrow C by the biasing force of the coil spring 90. In cooperation therewith, the second gear 92 is rotated in a clockwise direction. As a result, the first finger 94 is pivoted about the shaft 98 in a counterclockwise direction, and the second finger 96 is pivoted about the shaft 100 in a clockwise direction, thus obtaining the grip position of the grip hand 25 where the opposite side surfaces of the magnetic tape cartridge 30 are gripped by the first and second fingers 94 and 96. In this grip position, the grip hand 25 elastically grips the opposite side surfaces of the cartridge 30 with the aid of the biasing force of the coil spring 90.

In contrast, when the motor is driven, the first gear 86 is rotated in a clockwise direction against the biasing force of the coil spring 90. In cooperation therewith, the second gear 92 is rotated in a counterclockwise direction. As a result, the first finger 94 is pivoted about the shaft 98 in a clockwise direction, and the second finger 96 is pivoted about the shaft 100 in a counterclockwise direction, thus obtaining the release position of the grip hand 25 as shown in FIG. 8. During the course of movement from the grip position to the release position of the grip hand 25, the rollers 116 and 116' mounted at the other ends 94b and 96b of the first and second fingers 94 and 96 function to urge the magnetic tape cartridge 30 into the selected magnetic tape drive unit 28 or the selected cell 18 as will be hereinafter described.

The insert operation of the cartridge 30 into the selected magnetic tape drive unit 28 will now be described with reference to FIGS. 9A and 9B to FIGS. 12A and 12B.

Figure 9A:
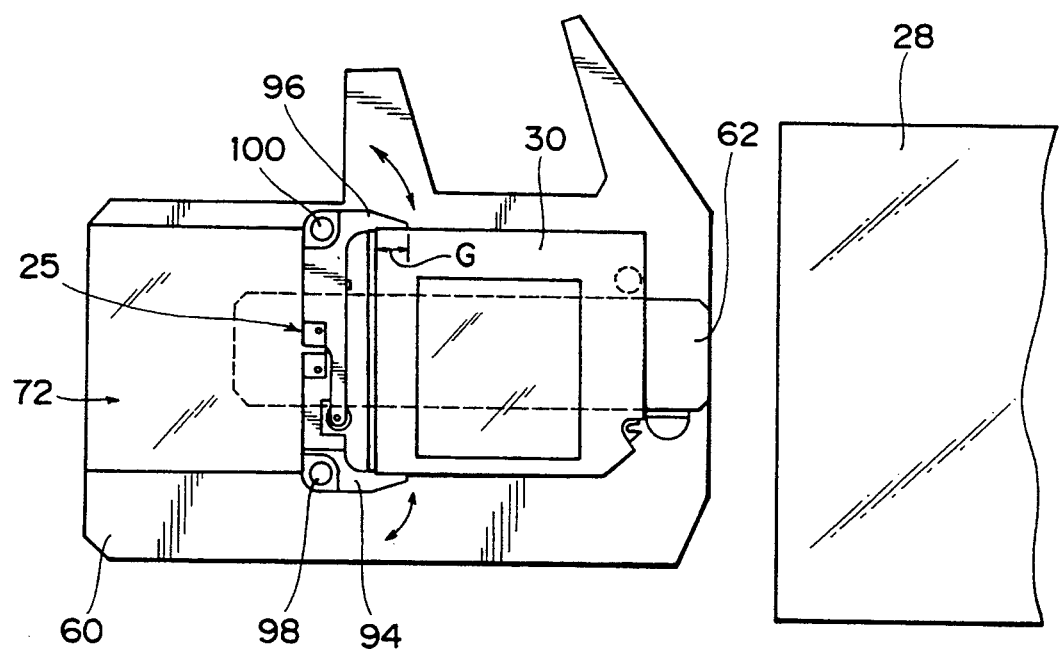
FIGS. 9A, 10A, 11A and 12A, and FIGS. 9B, 10B, 11B and 12B are plan views and side views, respectively, illustrating an operation of inserting the cartridge into a magnetic tape drive unit by the hand mechanism according to the first preferred embodiment.
Figure 9B:
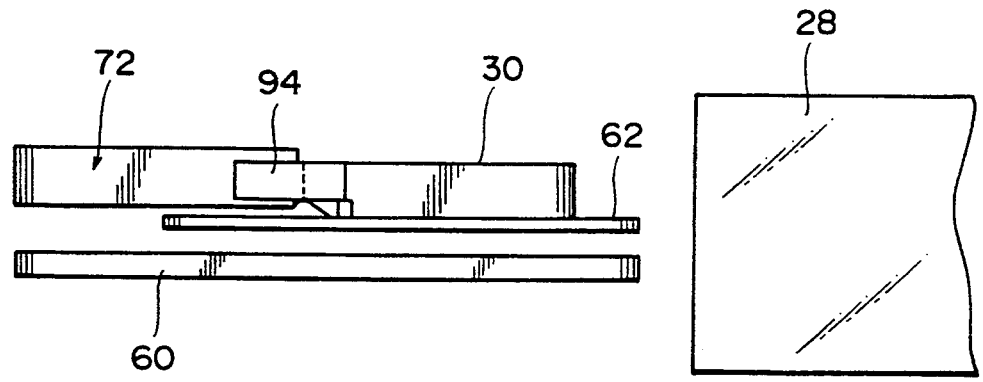

The accessor 20 operates to take the magnetic tape cartridge 30 out of the desired cell 18 of the cell drum 12 and carry the cartridge 30 to the front side of the magnetic tape drive unit 28 as shown in FIGS. 9A and 9B. In this operation, the grip hand 25 grips the opposite side surfaces of the cartridge 30. A grip length G by the grip hand 25 is suitably set to about 15 mm.

Figure 10A:
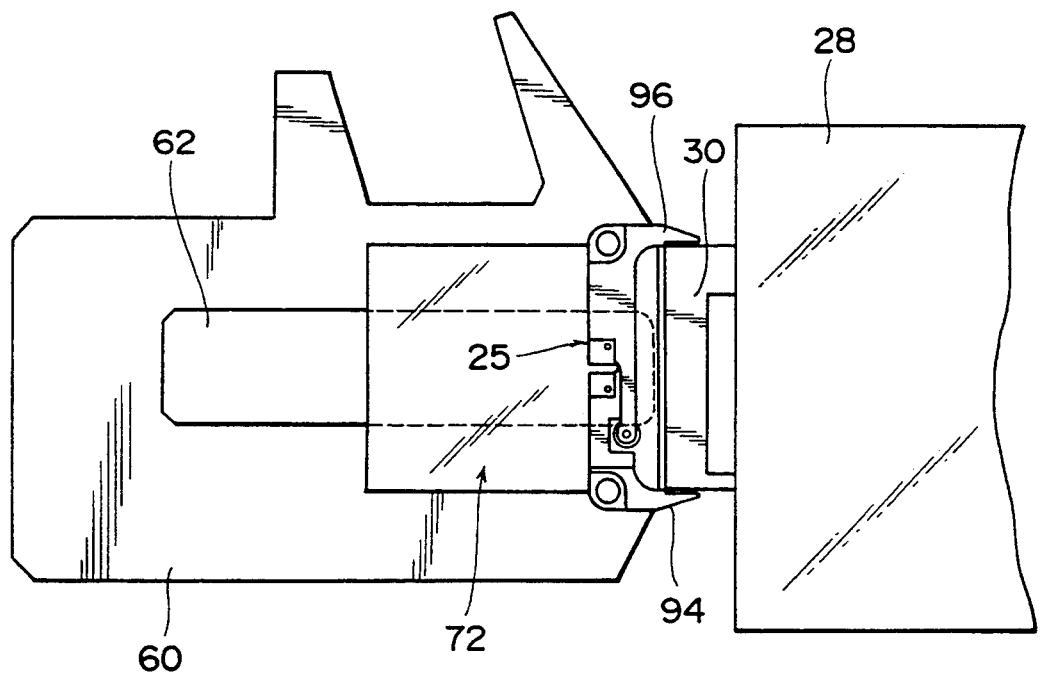
Figure 10B:
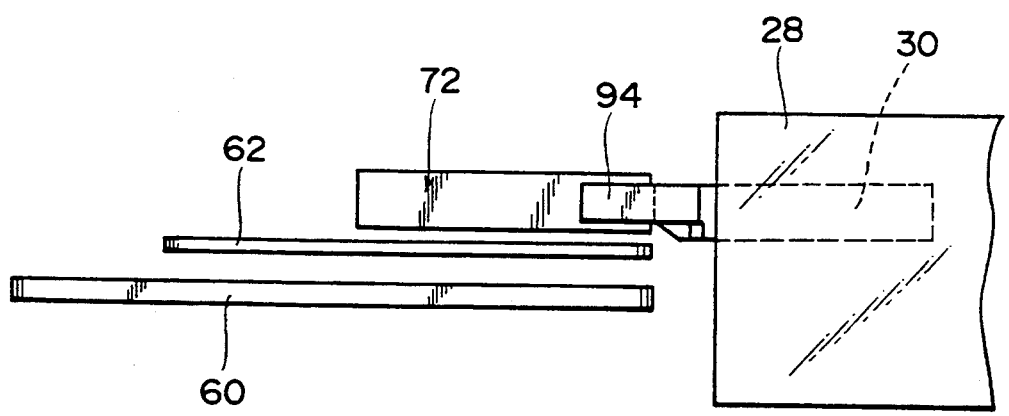

Then, as shown in FIGS. 10A and 10B, the hand unit 72 is advanced under the condition where the cartridge 30 is gripped by the grip hand 25 to insert the cartridge 30 into an insert opening of the magnetic tape drive unit 28. In this condition, the first finger 94 and the second finger 96 of the grip hand 25 abuts against the insert opening of the magnetic tape drive unit 28, so that the cartridge 30 cannot be deeply inserted into the magnetic tape drive unit 28.

Figure 11A:
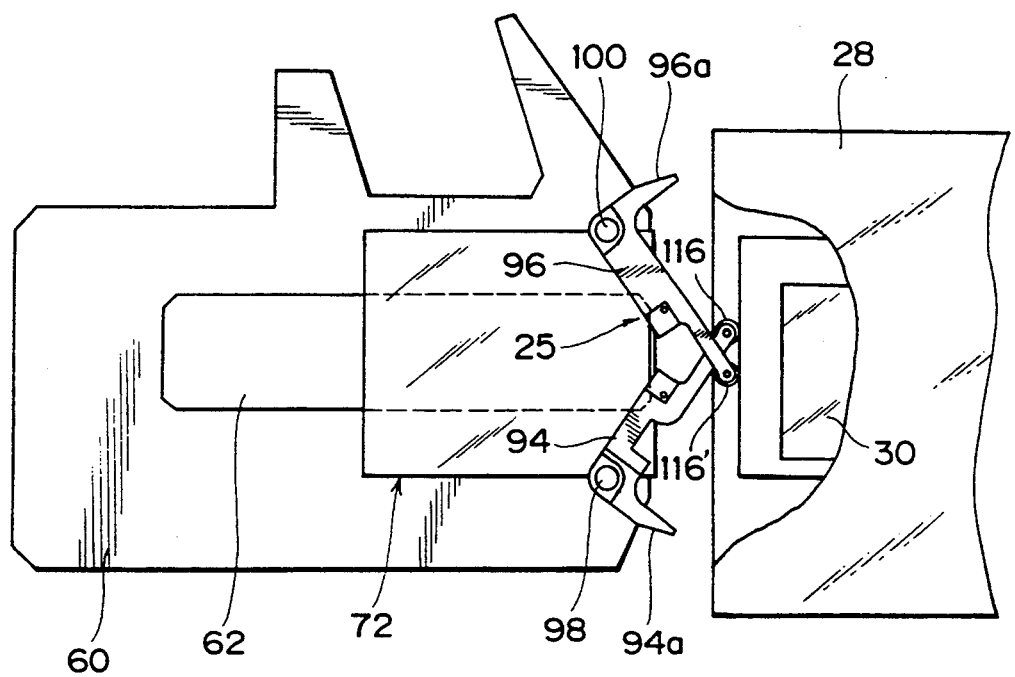
Figure 11B:
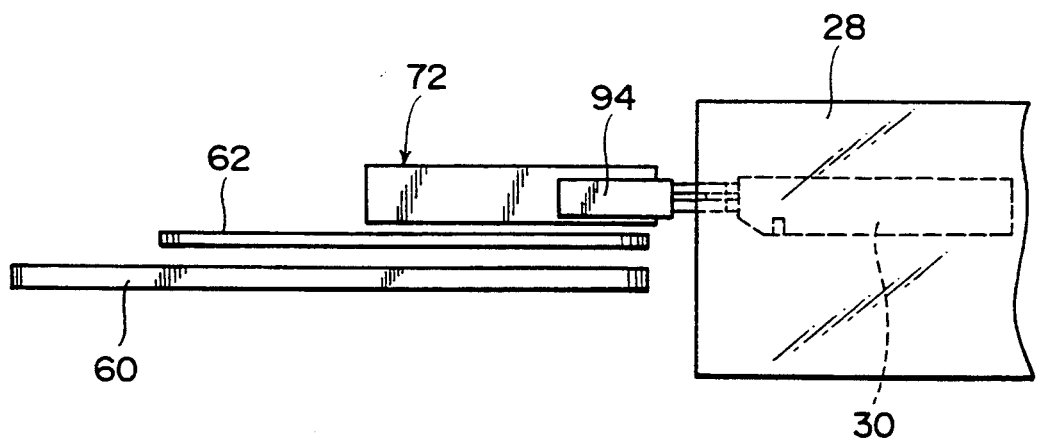

To cope with this, the motor for driving the first gear 86 shown in FIG. 8 is driven to rotate the first gear 86 in the clockwise direction against the biasing force of the coil spring 90. Accordingly, the first finger 94 is pivoted about the shaft 98 in the clockwise direction. At the same time, the second gear 92 meshing with the first gear 86 is rotated in the counterclockwise direction, and the second finger 96 is accordingly pivoted about the shaft 100 in the counterclockwise direction. As a result, the grip hand 25 is opened as shown in FIGS. 11A and 11B, and the rollers 116 and 116' mounted at the ends of the first and second fingers 94 and 96 are projected forward to abut against a rear end of the cartridge 30. Thus, the cartridge 30 can be deeply inserted into the magnetic tape drive unit 28. In this insert operation, the cartridge 30 is pushed at two points spaced substantially equally from a center line of the cartridge 30 by the rollers 116 and 116', so that the cartridge 30 can be stably pushed into the magnetic tape drive unit 28.

Figure 12A:
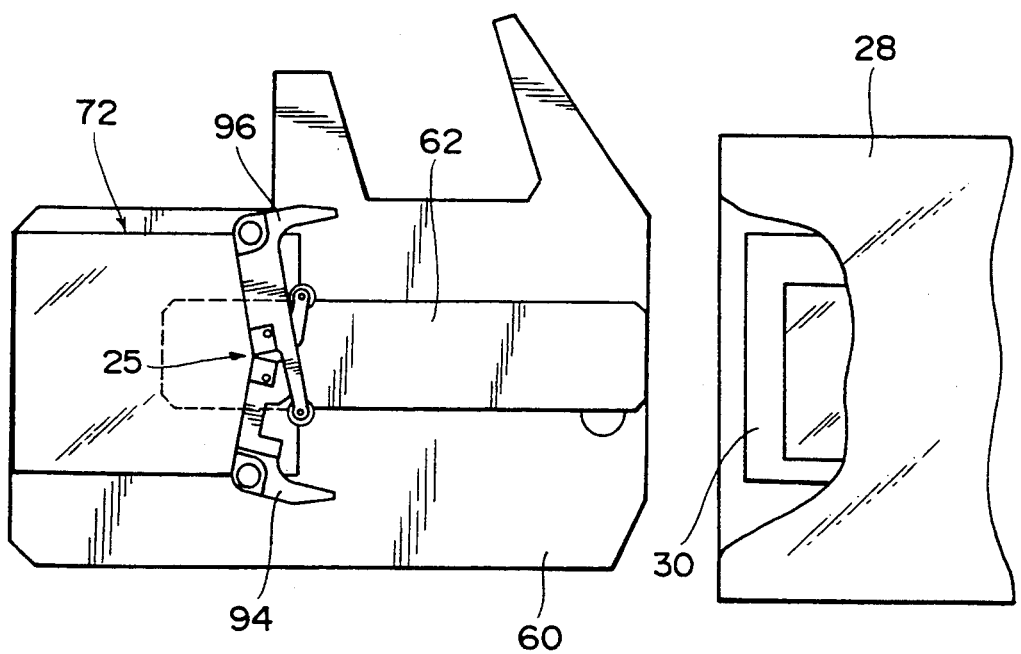
Figure 12B:
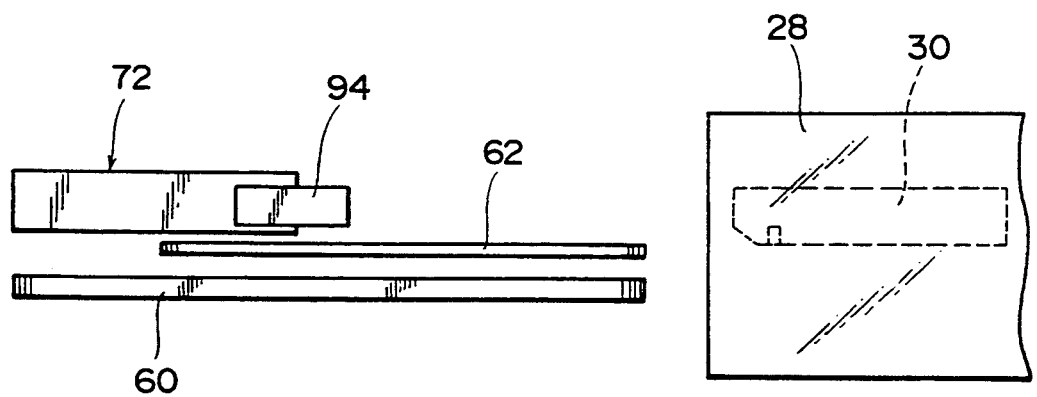

After inserting the cartridge 30 into the magnetic tape drive unit 28, the grip hand 25 is closed and the hand unit 72 is returned to the retracted position as shown in FIGS. 12A and 12B. Thus, the insert operation of the cartridge 30 into the magnetic tape drive unit 28 is ended.

In the event that the positional relation among the accessor 20, the cell drum 12 and the magnetic tape drive units 28 is disordered because of variations in constructing the apparatus, there is a possibility that the cartridge 30 will be insufficiently inserted into the magnetic tape drive unit 28 by the push of the first and second fingers 94 and 96 shown in FIGS. 11A and 11B. In such a case, the hand unit 72 is further advanced in the inserted condition of the cartridge 30 shown in FIGS. 11A and 11B, thereby completely inserting the cartridge 30 into the magnetic tape drive unit 28. As apparent from the above description and the related drawings, the tray 62 is maintained at the retracted position in the insert operation of the cartridge 30 into the magnetic tape drive unit 28.

The operation of storing the cartridge 30 into the selected cell 18 of the cell drum 12 will now be described with reference to FIGS. 13A and 13B to FIGS. 16A and 16B.

As mentioned above, the grip length G of the rear, side surfaces of the cartridge 30 by the grip hand 25 is set to about 15 mm. Since this length G is much smaller than a total length of the cartridge 30, there is a possibility that the cartridge 30 gripped by the grip hand 25 will be lowered at a front portion thereof. To cope with this, the tray 62 is advanced to support the cartridge 30 from the lower side thereof in storing the cartridge 30 into the cell 18, thereby preventing the possibility of lowering of the front portion of the cartridge 30.

Figure 13A:
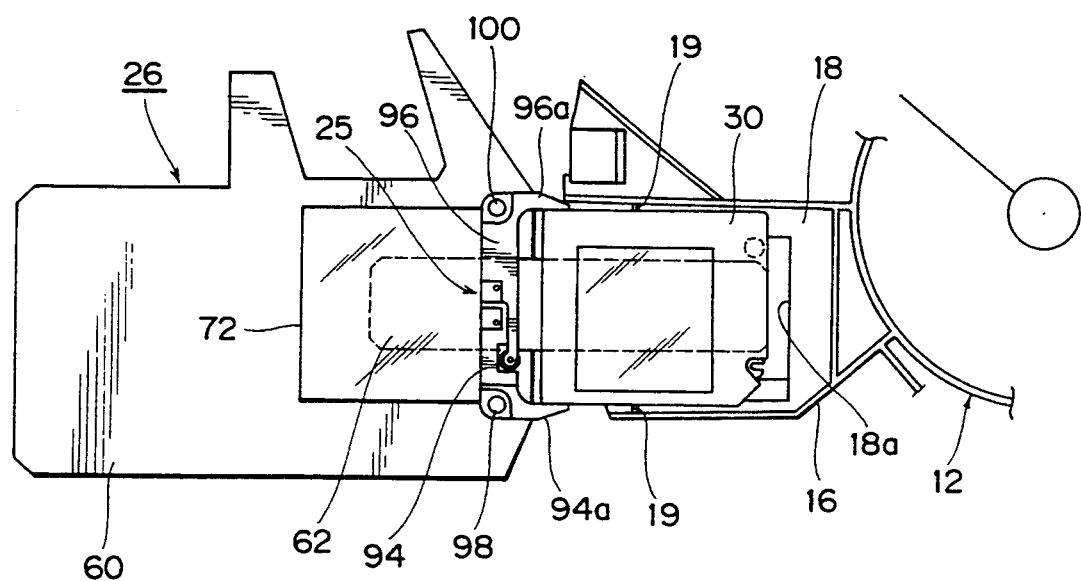
FIGS. 13A, 14A, 15A and 16A, and FIGS. 13B, 14B, 15B and 16B are plan views and side views, respectively, illustrating an operation of inserting the cartridge into a cell by the hand mechanism according to the first preferred embodiment.
Figure 13B:
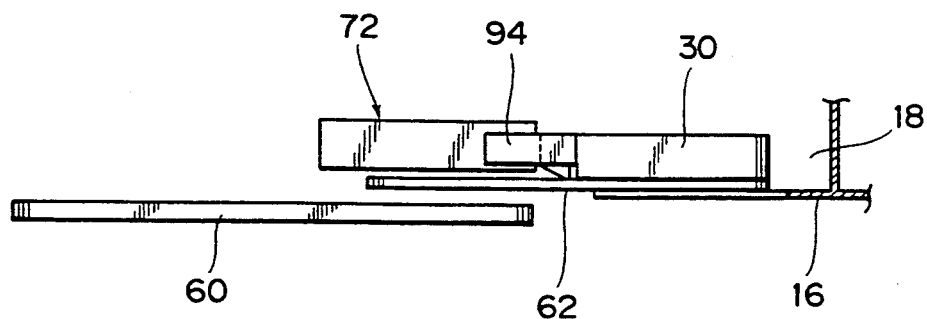

First, the mechanical hand 26 of the accessor 20 is positioned to the front side of the desired cell 18 into which the cartridge 30 is to be stored. Then, as shown in FIGS. 13A and 13B, the tray 62 is advanced and deeply inserted into the cell 18. Then, the hand unit 72 is advanced to insert the cartridge 30 gripped by the grip hand 25 into the cell 18. In this condition, the first and second fingers 94 and 96 of the grip hand 25 comes into abutment against an insert opening of the cell 18, and accordingly the cartridge 30 cannot be deeply inserted into the cell 18.

Figure 14A:
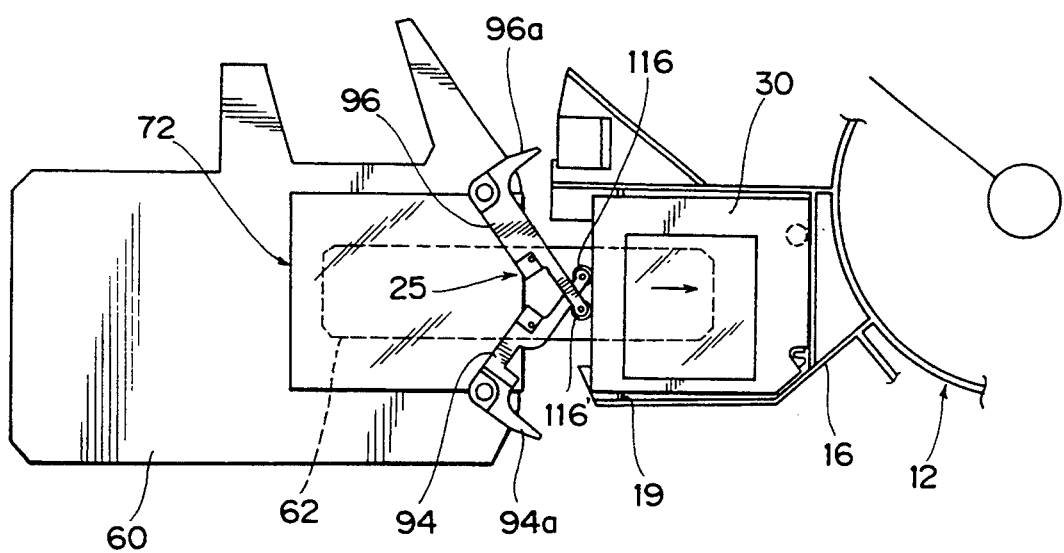
Figure 14B:
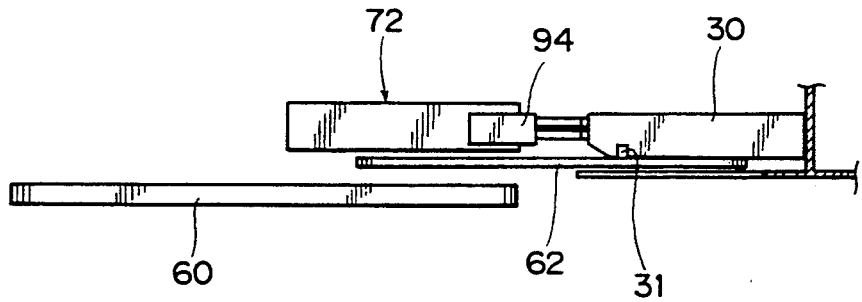

To cope with this, as shown in FIGS. 14A and 14B, the grip hand 25 is driven by the drive mechanism shown in FIG. 8 to forward project the rollers 116 and 116' mounted at the ends of the first and second fingers 94 and 96. As a result, the rear end of the cartridge 30 is pushed by the rollers 116 and 116', so that the cartridge 30 is deeply inserted into the cell 18. When the cartridge 30 is completely inserted into the cell 18, a pair of projections 19 formed on an inside wall of the cell 18 come into engagement with a pair of grooves 31 formed on the opposite side surfaces of the cartridge 30, thereby preventing the cartridge 30 from escaping out of the cell 18 because of vibration or the like.

Figure 15A:
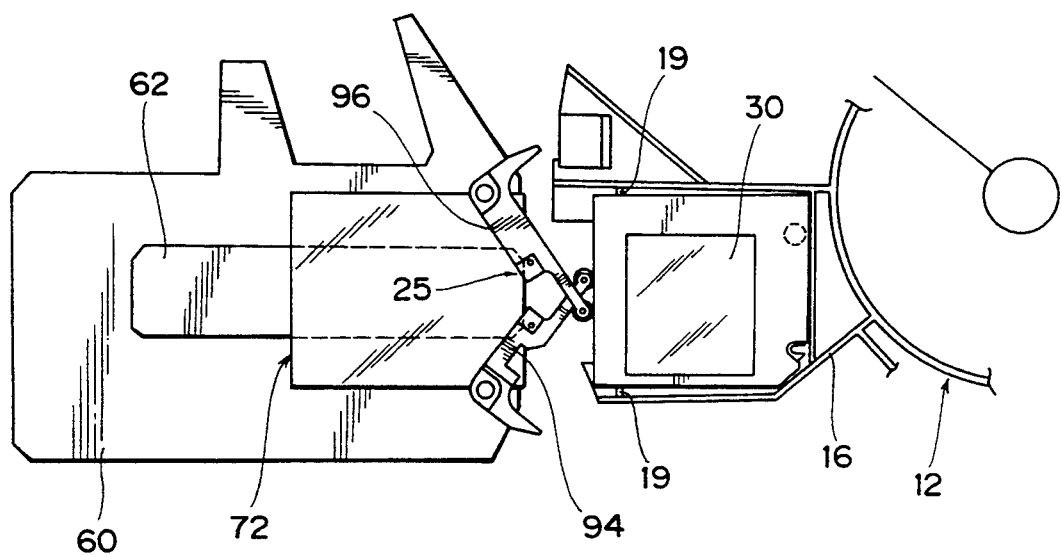
Figure 15B:
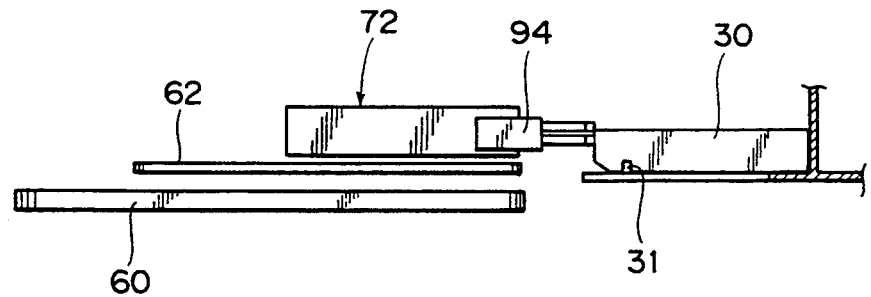
Figure 16A:
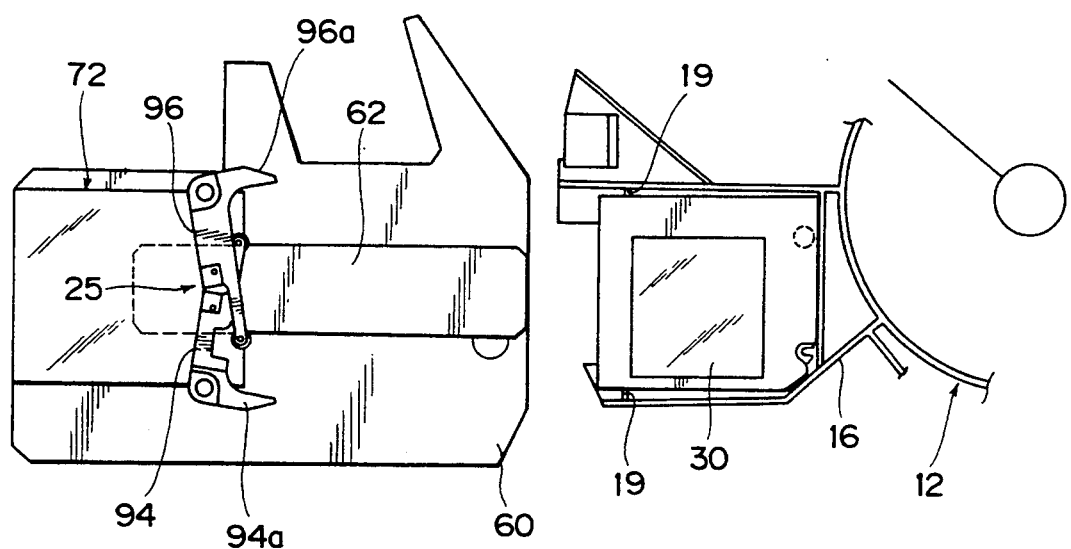
Figure 16B:
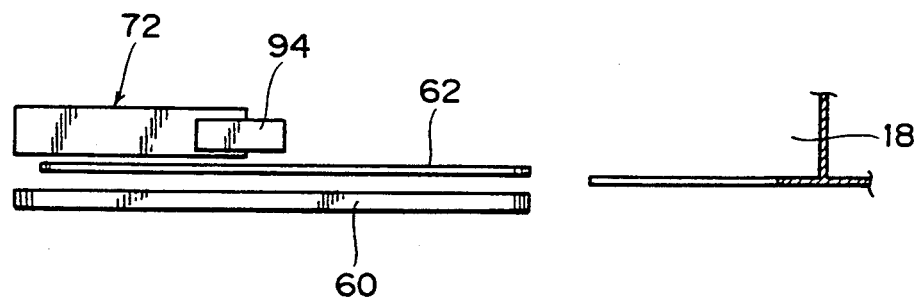

After completing the insertion of the cartridge 30 into the cell 18, the tray 62 is returned to the retracted position as shown in FIGS. 15A and 15B. Then, the grip hand 25 is closed, and the hand unit 72 is returned to the retracted position as shown in FIGS. 16A and 16B. Thus, the storing operation of the cartridge 30 into the cell 18 is ended. In the event that the positional relation among the accessor 20, the cell drum 12 and the magnetic tape drive units 28 is disordered because of variations in constructing the apparatus, there is a possibility that the cartridge 30 will be insufficiently inserted into the cell 18 by the push of the first and second fingers 94 and 96 shown in FIGS. 14A and 14B. In such a case, the hand unit 72 is further advanced in the inserted condition of the cartridge 30 shown in FIGS. 14A and 14B, thereby completely inserting the cartridge 30 into the cell 18.

The operation of taking the cartridge 30 out of the cell 18 will now be described with reference to FIGS. 17A and 17B. As mentioned above, in the stored condition of the cartridge 30 in the cell 18, the projections 19 formed on the inside wall of the cell 18 are engaged with the grooves 31 formed on the opposite side surfaces of the cartridge 30 to thereby prevent the cartridge 30 from escaping out of the cell 18.

Figure 17A:
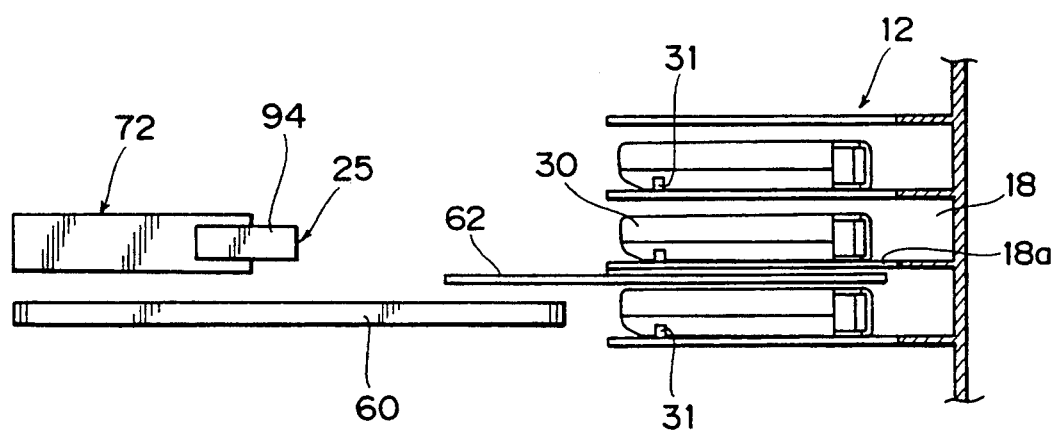
FIGS. 17A and 17B are partially sectional side views illustrating an operation of taking the cartridge out of the cell by the hand mechanism according to the first preferred embodiment.
Figure 17B:
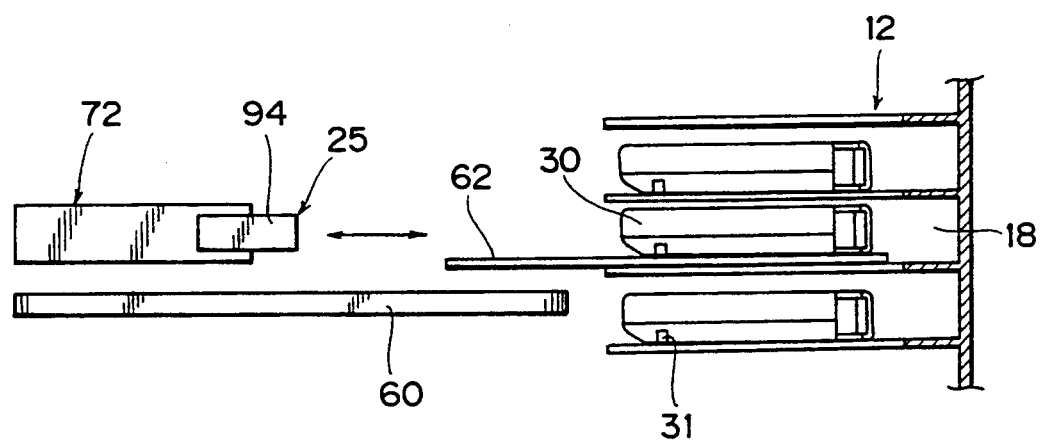

In taking the cartridge 30 out of the cell 18, the tray 62 is first inserted into the lower cell 18 as shown in FIG. 17A. Then, as shown in FIG. 17B, the tray 62 is raised through a lower opening 18a of the upper cell 18 to receive the cartridge 30 stored in the upper cell 18. Then, the hand unit 72 is advanced to grip the opposite side surfaces of the cartridge 30 placed on the tray 62 with the grip hand 25. Then, the hand unit 72 is returned to the retracted position to take the cartridge 30 out of the cell 18. In this condition, the cartridge 30 gripped by the grip hand 25 is slid on the tray 62. Then, the tray 62 is returned to the retracted position.

In this way, the cartridge 30 is once received on the tray 62, and it is then gripped by the grip hand 25 in the taking operation of the cartridge 30 out of the cell 18. Accordingly, in receiving the cartridge 30 from the cell 18 onto the base 60 by means of the hand unit 72, there is almost no possibility of the cartridge 30 flying from the tray 62, but the cartridge 30 can be received with a proper attitude onto the base 60.

Figure 18A:
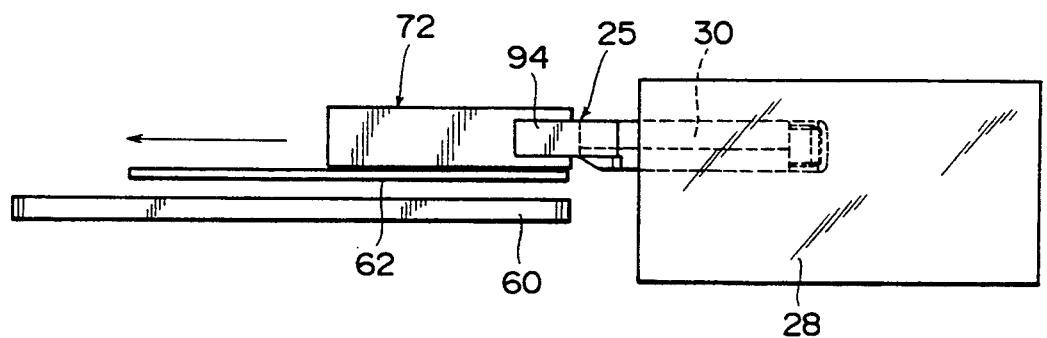
FIGS. 18A, 18B and 18C are side views illustrating flying of the cartridge possibly occurring in taking the cartridge out of the magnetic tape drive unit by the hand mechanism according to the first preferred embodiment.

In transferring the cartridge 30 to and from the magnetic tape drive unit 28, the hand unit 72 only is moved to transfer the cartridge 30 to and from the magnetic tape drive unit 28 with the tray 62 maintained at the retracted position. In drawing the cartridge 30 from the magnetic tape drive unit 28, the hand unit 72 is advanced with the tray 62 maintained at the retracted position as shown in FIG. 18A, and the grip hand 25 is operated to grip the cartridge 30 ejected from the magnetic tape drive unit 28.

However, in drawing the cartridge 30 gripped by the grip hand 25 from the magnetic tape drive unit 28, there is a possibility that a tapering portion 35 of the cartridge 30 will collide with a front edge 62a of the tray 62. This collision causes flying of the cartridge 30 as shown by an arrow A in FIG. 18B because the cartridge 30 is gripped by the grip hand 25 in a lateral direction only. Accordingly, as shown in FIG. 18C, the cartridge 30 is received by the mechanical hand 26 onto the base 60 with the cartridge 30 remaining flying from the tray 62. If the cartridge 30 is not properly gripped by the grip hand 25 as mentioned above and is to be inserted into the cell 18 or the magnetic tape drive unit 28 in such an improper condition, there is a possibility that the cartridge 30 will be inserted to an improper position or will become impossible to insert.

Figure 19:
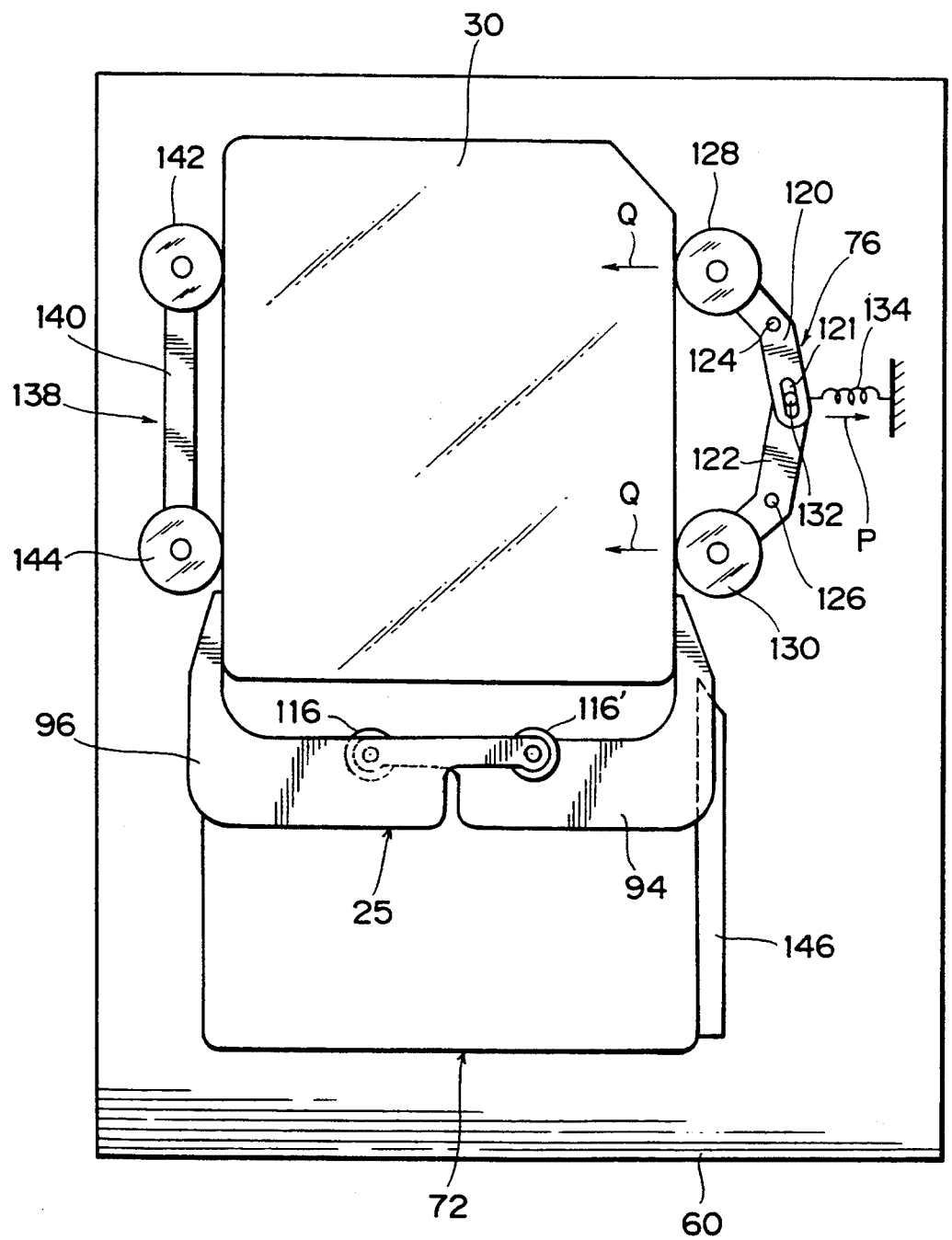
FIG. 19 is a schematic plan view of a hand mechanism according to a second preferred embodiment of the present invention provided with a cartridge gripped condition correcting mechanism.

There will now be described a second preferred embodiment of the mechanical hand according to the present invention provided with a cartridge received condition or gripped condition correcting mechanism for correcting such an improper condition of the cartridge 30. Referring to FIG. 19, there is shown a schematic plan view of a hand mechanism according to the second preferred embodiment of the present invention. In the second preferred embodiment, substantially the same parts as those in the first preferred embodiment will be denoted by the same reference numerals, and the explanation thereof will be omitted hereinafter to avoid duplication.

Figure 20:
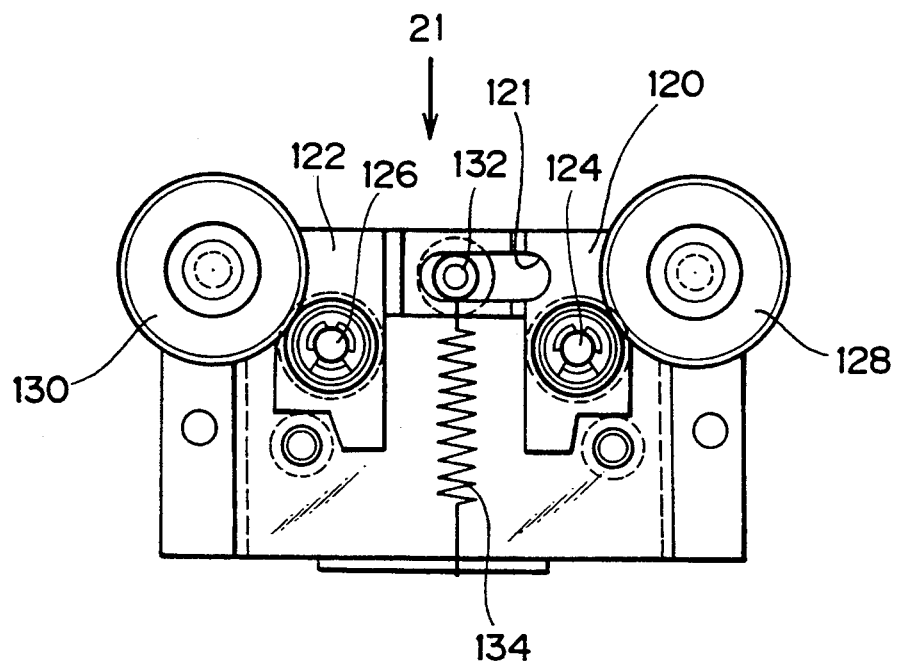
FIG. 20 is a plan view of a bias-side positioning mechanism shown in FIG. 19.
Figure 21:
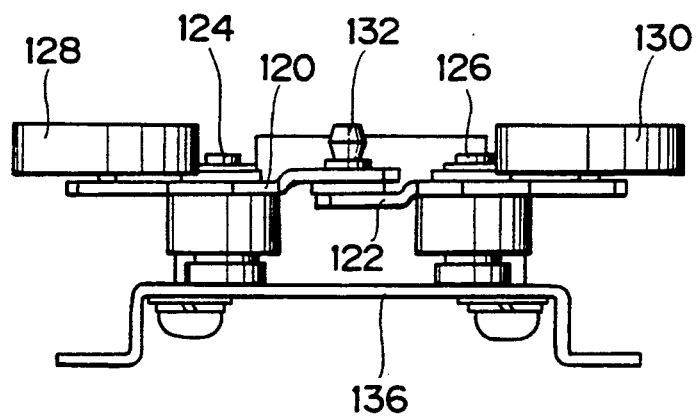
FIG. 21 is a view taken in a direction depicted by an arrow 21 in FIG. 20.

A bias-side positioning mechanism 76 and a reference-side positioning mechanism 138 are provided on a base 60. As best shown in FIGS. 20 and 21, the bias-side positioning mechanism 76 includes an arm 120 pivotably supported to a pin 124 and an arm 122 pivotably supported to a pin 126. A roller 128 is rotatably mounted at one end of the arm 120, and a roller 130 is rotatably mounted at one end of the arm 122. An elongated hole 121 is formed at the other end of the arm 120, and a pin 132 is fixed at the other end of the arm 122. The pin 132 is inserted in the elongated hole 121. The pin 132 is normally biased by a tension spring 134 in a direction depicted by an arrow P in FIG. 19. As shown in FIG. 21, the arms 120 and 122 are mounted through the pins 124 and 126 on a bracket 136, and the bracket 136 is fixed to the base 60 by means of screws (not shown).

On the other hand, the reference-side positioning mechanism 138 is constructed of a bracket 140 fixed to the base 60 and two rollers 142 and 144 rotatably mounted to the bracket 140 at the opposite ends thereof. The bracket 140 extends in parallel to a moving direction of a hand unit 72. As shown in FIG. 19, a first side surface of a cartridge 30 is brought into abutment against the rollers 142 and 144 to thereby define a lateral reference position of the cartridge 30. As the pin 132 of the bias-side positioning mechanism 76 is pulled by the tension spring 134 in the direction P, the arms 120 and 122 are pivoted about the pins 124 and 126, respectively. As a result, the rollers 128 and 130 are brought into abutment against a second side surface of the cartridge 30 to urge the cartridge 30 in a direction depicted by arrows Q, that is, toward the reference-side positioning mechanism 138.

A block 146 is provided on a lower, side surface of the hand unit 72 so as to extend in the moving direction of the hand unit 72. The block 146 is adapted to contact the rollers 128 and 130. An amount of projection of the block 146 from the side surface of the hand unit 72 is set to about 2 mm. The reason why the block 146 is provided on the side surface of the hand unit 72 is that a side surface of the block 146 is to be positively made outside of the second side surface of the cartridge 30 gripped by a grip hand 25. Accordingly, when the roller 130 is in contact with the block 146, the roller 128 is separate from the cartridge 30.

Now, the cartridge received condition correcting mechanism will be described with reference to FIGS.

Figure 22A:
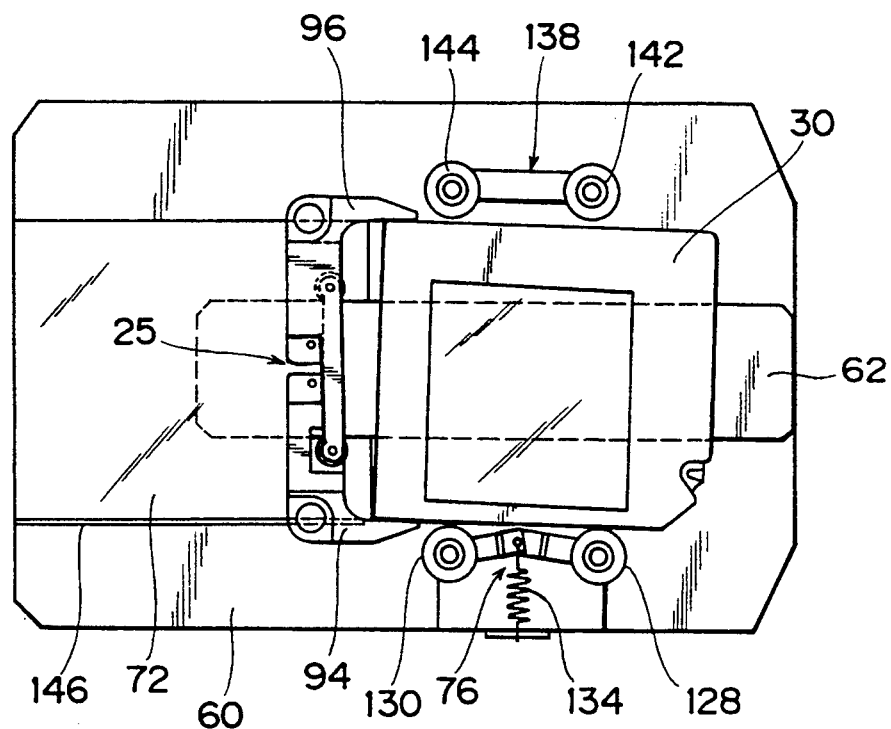
FIGS. 22A, 22B and 22C are plan views illustrating a cartridge gripped condition correcting operation of the hand mechanism according to the second preferred embodiment.
Figure 22B:
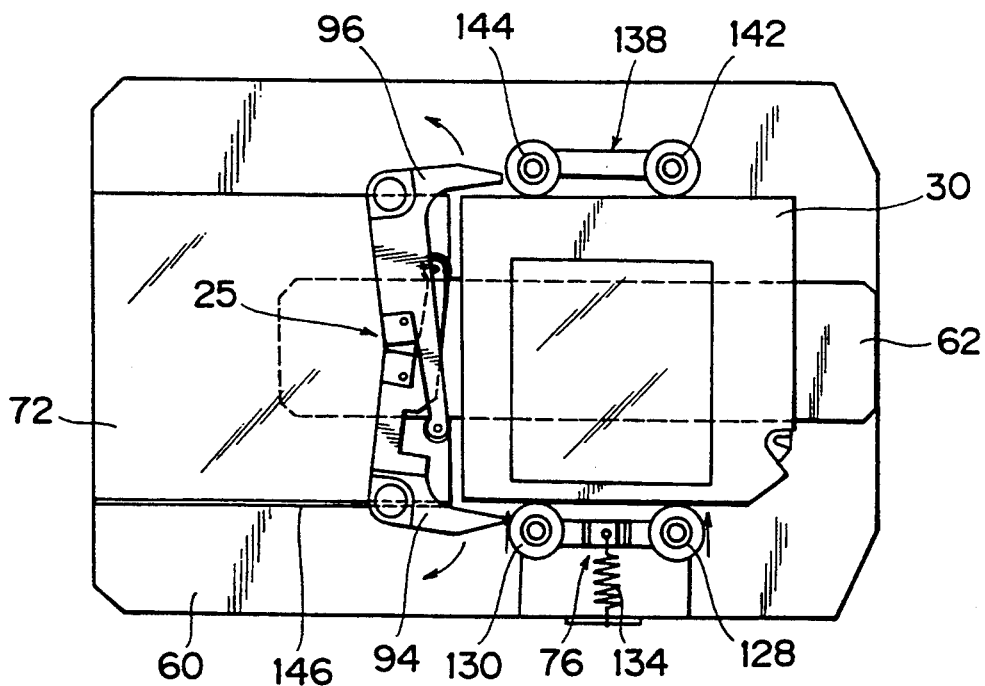

22A to 22C. It is assumed that the cartridge 30 is gripped by the grip hand 25 in the condition that the cartridge 30 is inclined in a horizontal plane as shown in FIG. 22A, for example. In this case, the grip hand 25 is once opened to release the cartridge 30 in a free condition as shown in FIG. 22B.

Figure 22C:
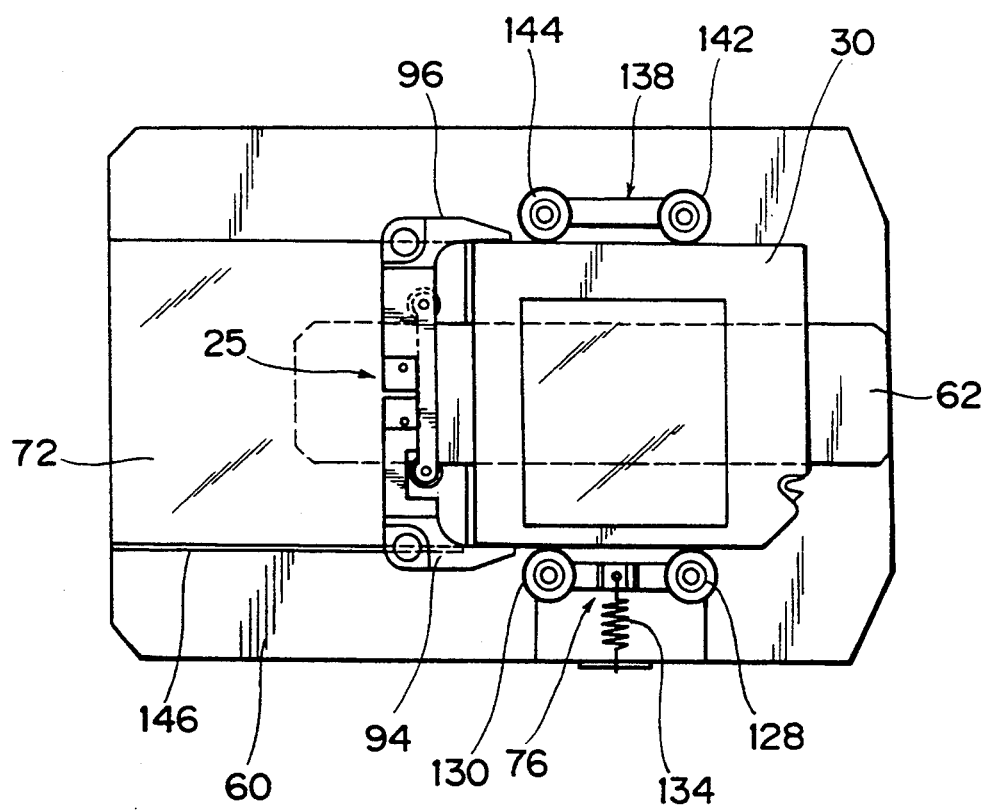

When the grip hand 25 is opened as mentioned above, the rollers 128 and 130 are urged against the second side surface of the cartridge 30 by the biasing force of the spring 134 of the bias-side positioning mechanism 76. Accordingly, the first side surface of the cartridge 30 is urged against the rollers 142 and 144 of the reference-side positioning mechanism 138, thereby correcting the inclined condition of the cartridge 30. Thereafter, the grip hand 25 is closed to grip the cartridge 30 as shown in FIG. 22C. Thus, the cartridge 30 can be received in a proper condition as corrected in attitude.

The operation of the second preferred embodiment in drawing the cartridge 30 from the cell 18 will be described with reference to FIGS. 23A and 23B to FIGS. 25A and 25B.

Figure 23A:
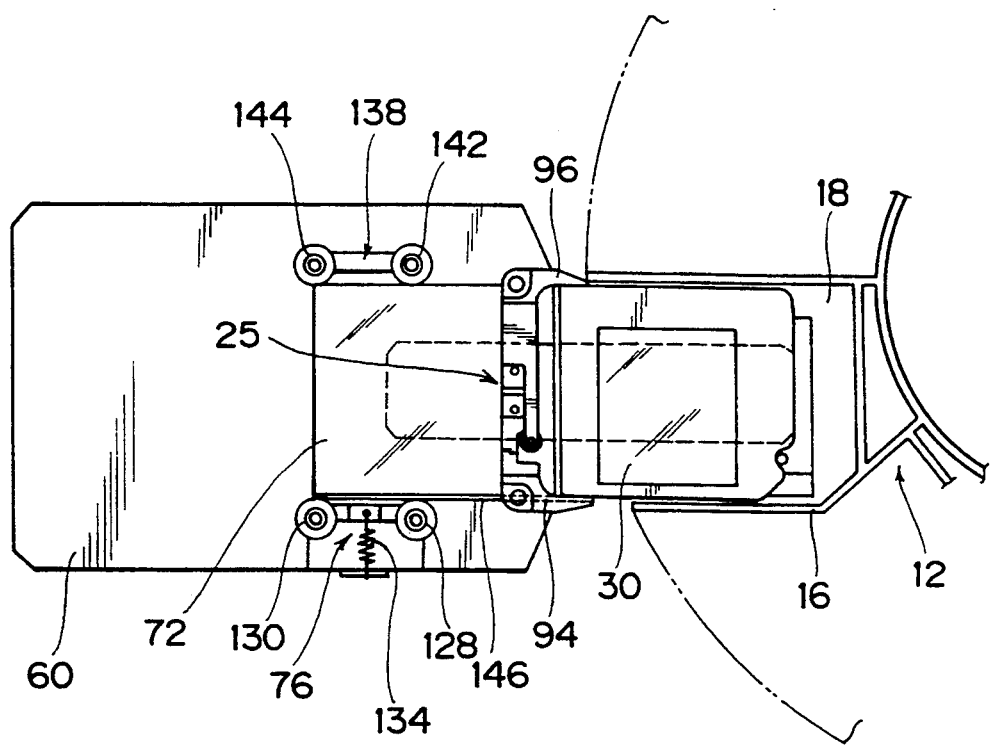
FIGS. 23A, 24A and 25A, and FIGS. 23B, 24B and 25B are plan views and side views, respectively, illustrating an operation of taking the cartridge out of the cell by the hand mechanism according to the second preferred embodiment.
Figure 23B:
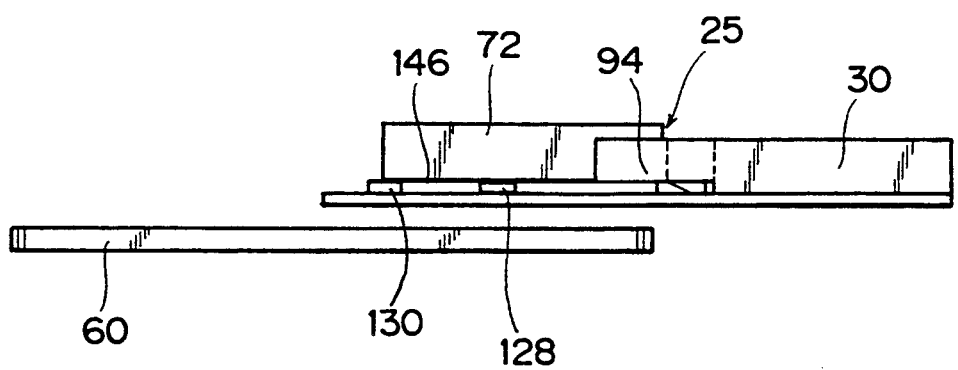
Figure 24A:
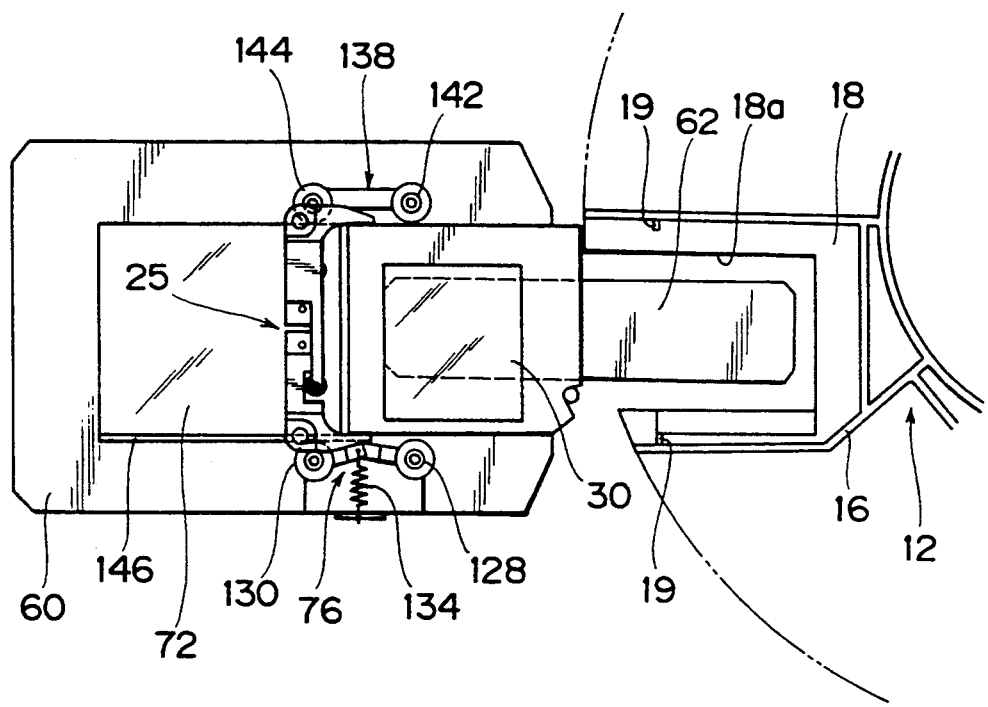
Figure 24B:
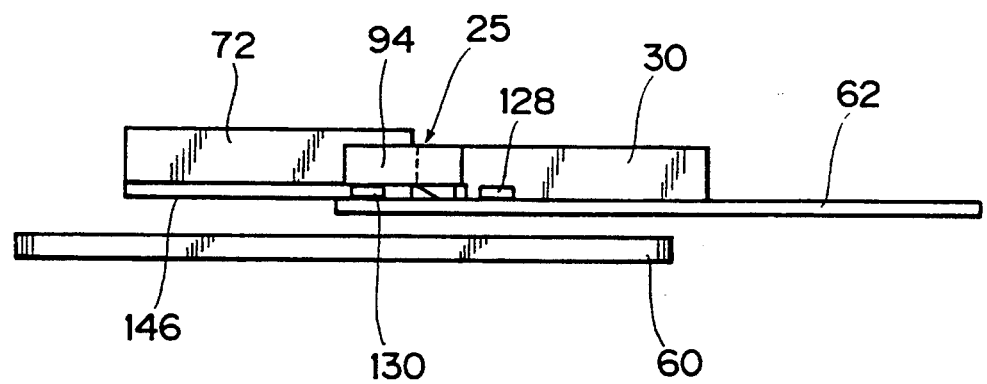

As shown in FIGS. 23A and 23B, the opposite side surfaces of the cartridge 30 at its rear end portion are gripped by the grip hand 25 to draw the cartridge 30 from the cell 18. At this time, the rollers 128 and 130 of the bias-side positioning mechanism 76 are in contact with the block 146, and the arms 120 and 122 are in an open condition. When the hand unit 72 is retracted to draw the cartridge 30 to the position shown in FIGS. 24A and 24B, the roller 128 comes into separation of the block 146. The rollers 128 and 130 of the bias-side positioning mechanism 76 are interlocked with each other to move in the same direction. Therefore, the roller 128 is separate from the second side surface of the cartridge 30 because the roller 130 still remains in contact with the block 146.

Figure 25A:
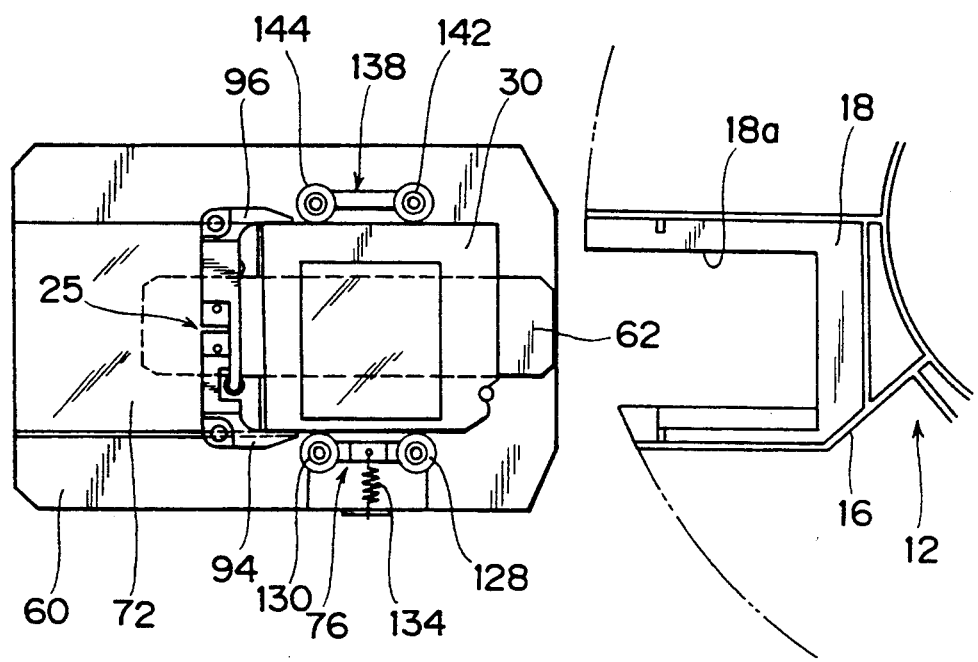
Figure 25B:
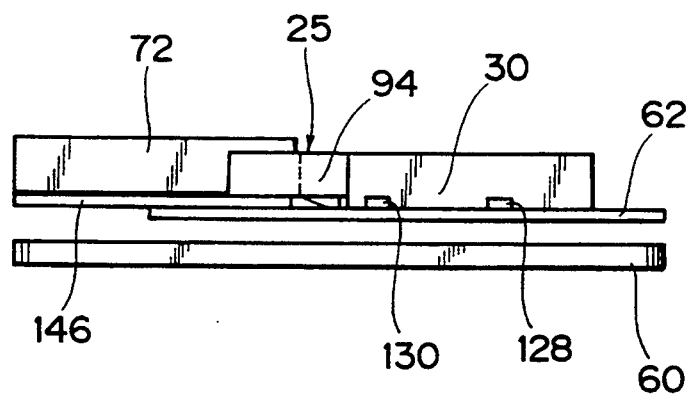

Thereafter, when the hand unit 72 is further retracted to the position shown in FIGS. 25A and 25B, the roller 130 comes into separation from the block 146, and both the rollers 128 and 130 are urged against the second side surface of the cartridge 30 by the force of the spring 134. After the cartridge 30 is received to a predetermined position, the grip hand 25 is once opened as shown in FIG. 22B. Accordingly, the cartridge 30 is released from the grip hand 25, and is urged against the rollers 142 and 144 of the reference-side positioning mechanism 138 by the bias-side positioning mechanism 76. Thus, the cartridge 30 is received in the predetermined position of the mechanical hand with the correct attitude.

Figure 26:
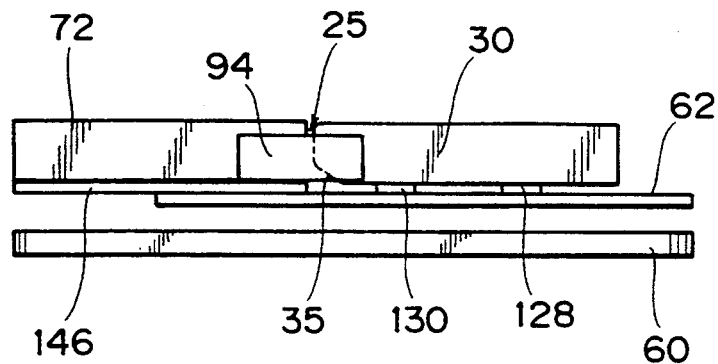
FIG. 26 is a side view illustrating a condition where rollers of the bias-side positioning mechanism slip under the cartridge.

The cartridge received condition correcting mechanism mentioned above is very effective for correction of the attitude of the received cartridge 30 in a horizontal plane, but the following problem will rarely occur. That is, as shown in FIG. 26, the cartridge 30 has a tapering portion 35 at a rear, lower end thereof, so that there is a possibility that the rollers 128 and 130 of the bias-side positioning mechanism 76 will slip under the cartridge 30 from the tapering portion 35. Even when the grip hand 25 is once opened to again grip the cartridge 30 in the above condition of the rollers 128 and 130, the attitude of the cartridge 30 cannot be corrected because the rollers 128 and 130 reside under the cartridge 30. If the cartridge 30 with such an incorrect attitude is inserted into the cell 18 or the magnetic tape drive unit 28, there is a possibility of occurrence of malfunction.

Figure 27:
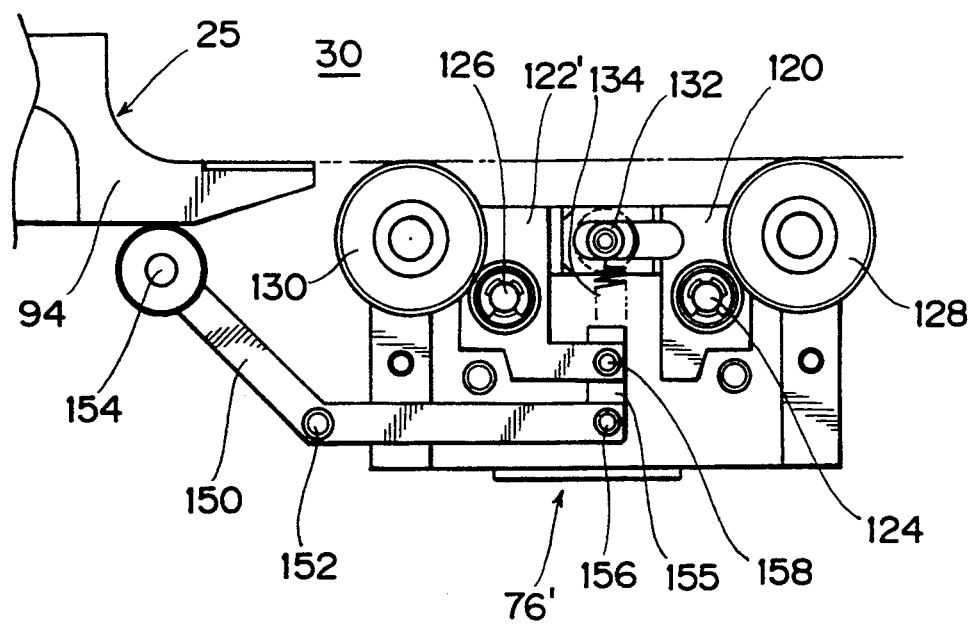
FIGS. 27 is a plan view of an improved bias-side positioning mechanism of the second preferred embodiment.
Figure 28:
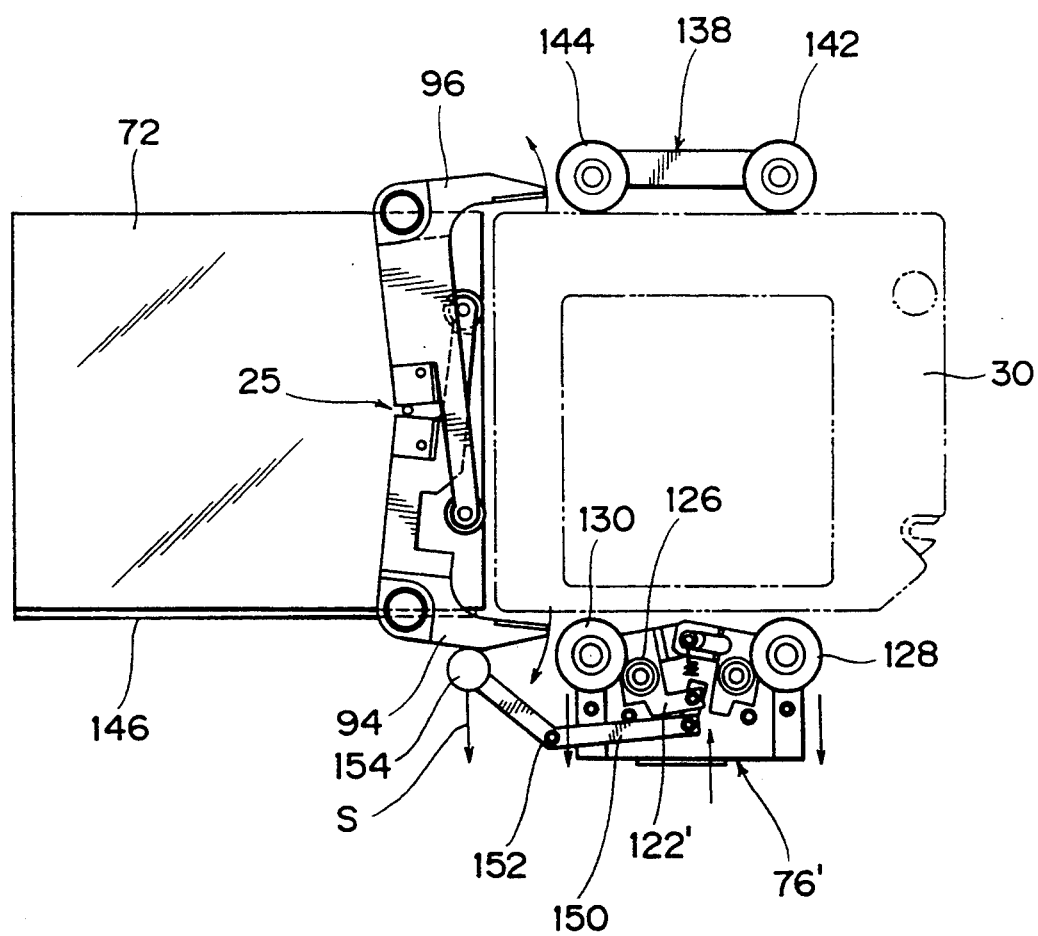
FIG. 28 is a plan view illustrating an operation of the improved bias-side positioning mechanism shown in FIG. 27.

This problem can be solved by an improvement of the second preferred embodiment as shown in FIGS. 27 and 28. Referring to FIG. 27, reference numeral 76' denotes an improved bias-side positioning mechanism. An arm 150 is pivotably supported to a shaft 152. A roller 154 is rotatably mounted at one end of the arm 150. The roller 154 is adapted to contact the finger 94 of the grip hand 25. The other end of the arm 150 is pivotably mounted through a pin 156 to a link 155 at one end thereof. The other end of the link 155 is pivotably mounted through a pin 158 to an arm 122' at one end thereof. The arm 122' is pivotably supported at an intermediate portion thereof to a pin 126. The other construction of the improved bias-side positioning mechanism 76' is substantially the same as that of the bias-side positioning mechanism 76 in the second preferred embodiment mentioned above.

The operation of the improvement will be described with reference to FIG. 28. When the grip hand 25 is opened to again grip the cartridge 30, the roller 154 contacting the finger 94 is moved in a direction depicted by an arrow S. Accordingly, the arm 150 is pivoted about the shaft 152 in a counterclockwise direction. As a result, the arm 122' is pivoted about the pin 126 through the link 155 in a counterclockwise direction, and both the arms 120 and 122' are opened to thereby forcibly separate the rollers 128 and 130 from the cartridge 30.

In this way, even when the rollers 128 and 130 reside under the cartridge 30 gripped by the grip hand 25, the cartridge 30 can be made fall on the tray 62 by opening the grip hand 25, thereby correcting a vertical position of the cartridge 30. Thereafter, when the cartridge 30 is again gripped by the grip hand 25, the rollers 128 and 130 of the bias-side positioning mechanism 76' are urged against the side surface of the cartridge 30 toward the rollers 142 and 144 of the reference-side positioning mechanism 138. Thus, the attitude of the cartridge 30 is corrected to a proper condition.

Now, a third preferred embodiment of the present invention provided with another cartridge received condition correcting mechanism will be described with reference to FIGS. 29 to 35B. Also in the third preferred embodiment, substantially the same parts as those in the previous preferred embodiments will be denoted by the same reference numerals, and the explanation thereof will be omitted hereinafter to avoid duplication.

Figure 29:
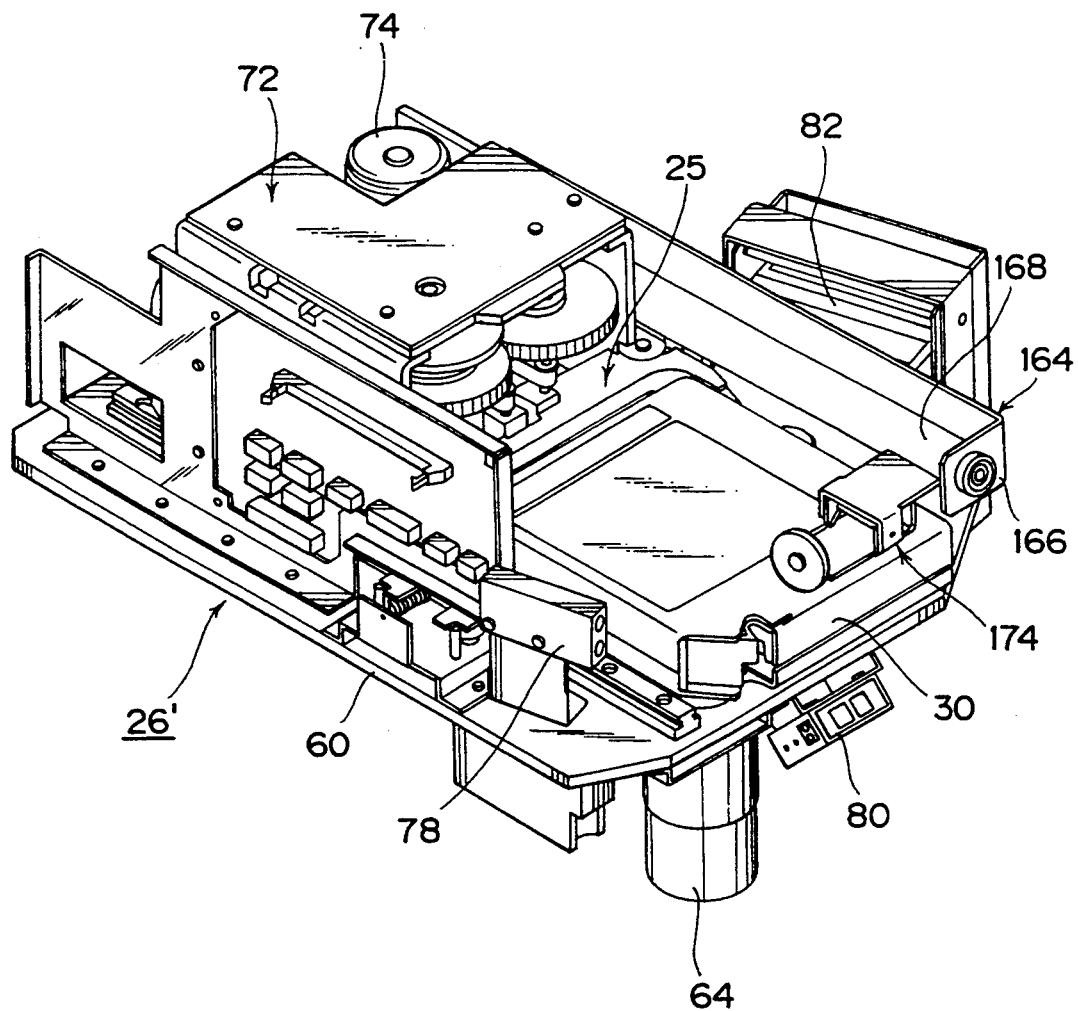
FIG. 29 is a perspective view of a hand mechanism according to a third preferred embodiment of the present invention.

Referring to FIG. 29, there is shown a perspective view of a mechanical hand 26' according to the third preferred embodiment in the condition where a magnetic tape cartridge 30 is received. The hand mechanism 26' is different from the mechanical hand 26 shown in FIG. 7 in the point that a cartridge grip condition or received condition correcting mechanism 164 is provided along one side surface of a base 60.

Figure 30:
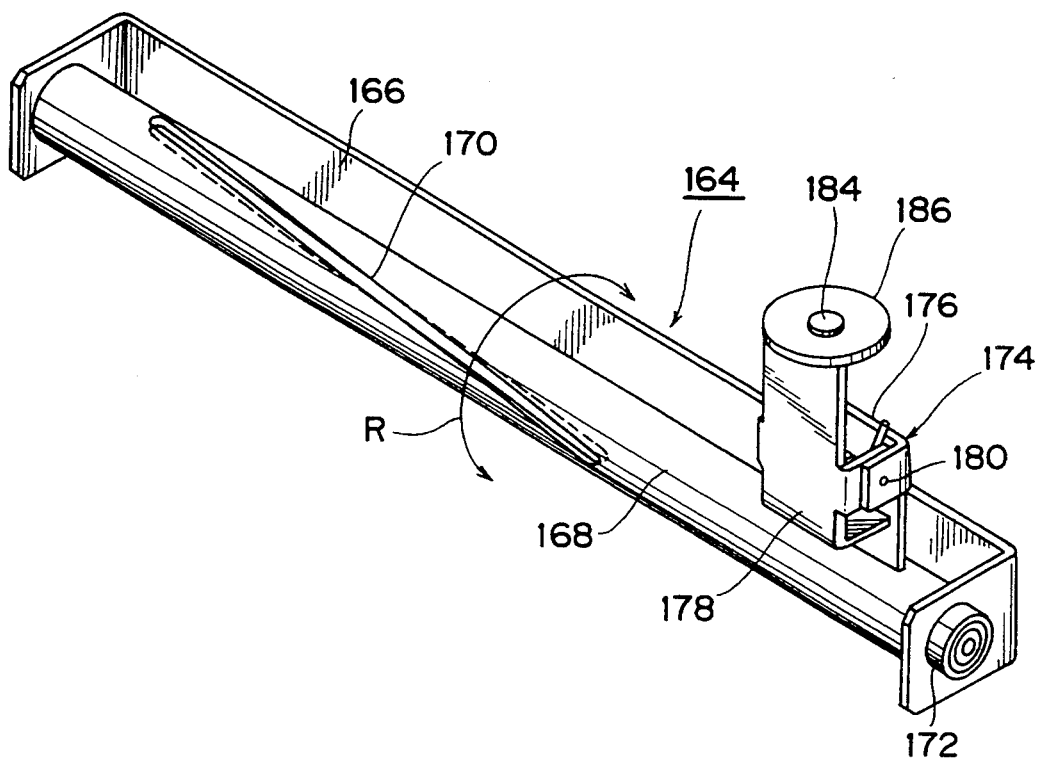
FIG. 30 is a perspective view of a cartridge gripped condition correcting mechanism provided in the hand mechanism shown in FIG. 29.
Figure 31:
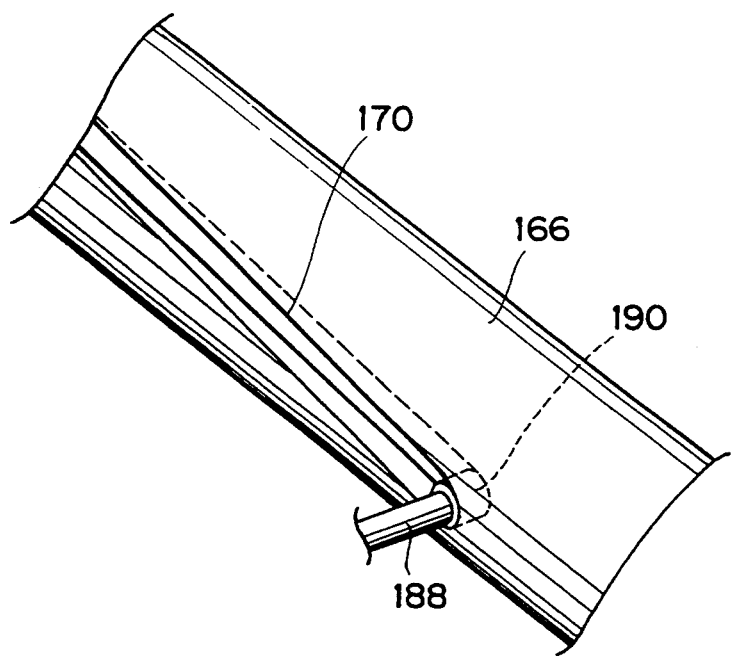
FIG. 31 is a partially cutaway enlarged perspective view of a cam shaft shown in FIG. 30.

As shown in FIG. 30, the cartridge gripped condition correcting mechanism 164 is constructed of a mounting member 166 fixed to the base 60, a cam shaft 168 rotatably mounted to the mounting member 166 by a pair of bearings 172, and a cartridge presser mechanism 174 fixed to the cam shaft 168. The cam shaft 168 is formed with a spiral cam groove 170. Although not shown, a pin 188 is fixed at one end thereof to a hand unit 72. As shown in FIG. 31, a roller 190 is rotatably mounted at the other end of the pin 188, and the roller 190 is inserted in the cam groove 170 of the cam shaft 168. Accordingly, the cam shaft 168 is rotated in opposite directions depicted by a double-headed arrow R in FIG. 30 in cooperation with movement of the hand unit 72 as will be hereinafter described in detail.

Figure 32:
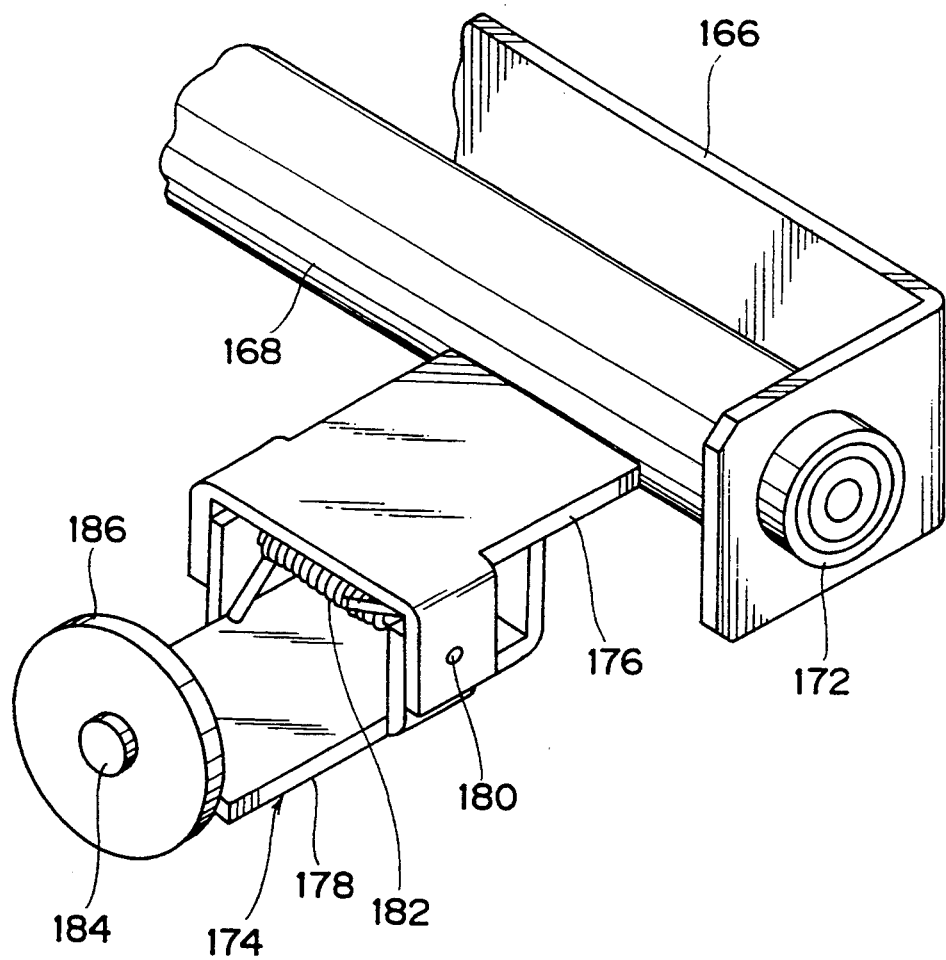
FIG. 32 is an enlarged perspective view of a cartridge presser mechanism shown in FIG. 30.

As shown in FIG. 32, the cartridge presser mechanism 174 is constructed of a bracket 176 fixed to the cam shaft 168 and an L-shaped member 178 pivotably mounted through a pin 180 to the bracket 176. A shaft 184 is fixed to one end of the L-shaped member 178, and a resin roller 186 is rotatably mounted on the shaft 184. A coil spring 182 is provided around the pin 180. The L-shaped member 178 is normally biased by the coil spring 182 in such a condition as shown in FIG. 32 so that the other end of the L-shaped member 178 resiliently abuts against the bracket 176 in receiving the cartridge 30 into the mechanical hand 26' the cam shaft 168 is rotated to make the cartridge presser mechanism 174 press an upper surface of the cartridge 30. At this time, application of an excess force onto the upper surface of the cartridge 30 is prevented by the operation of the coil spring 182.

The cartridge presser mechanism 174 is moved in cooperation with the hand unit 72. Accordingly, just before ending of the receiving operation of the cartridge 30 into the mechanical hand 26' the cartridge presser mechanism 174 will slip on the upper surface of the cartridge 30. In this preferred embodiment, however, the resin roller 186 mounted at the end of the cartridge presser mechanism 174 rolls on the upper surface of the cartridge 30, thereby protecting a label or the like attached on the upper surface of the cartridge 30.

The operation of the third preferred embodiment will be described with reference to FIGS. 33A and 33B to FIGS. 35A and 35B.

Figure 33A:
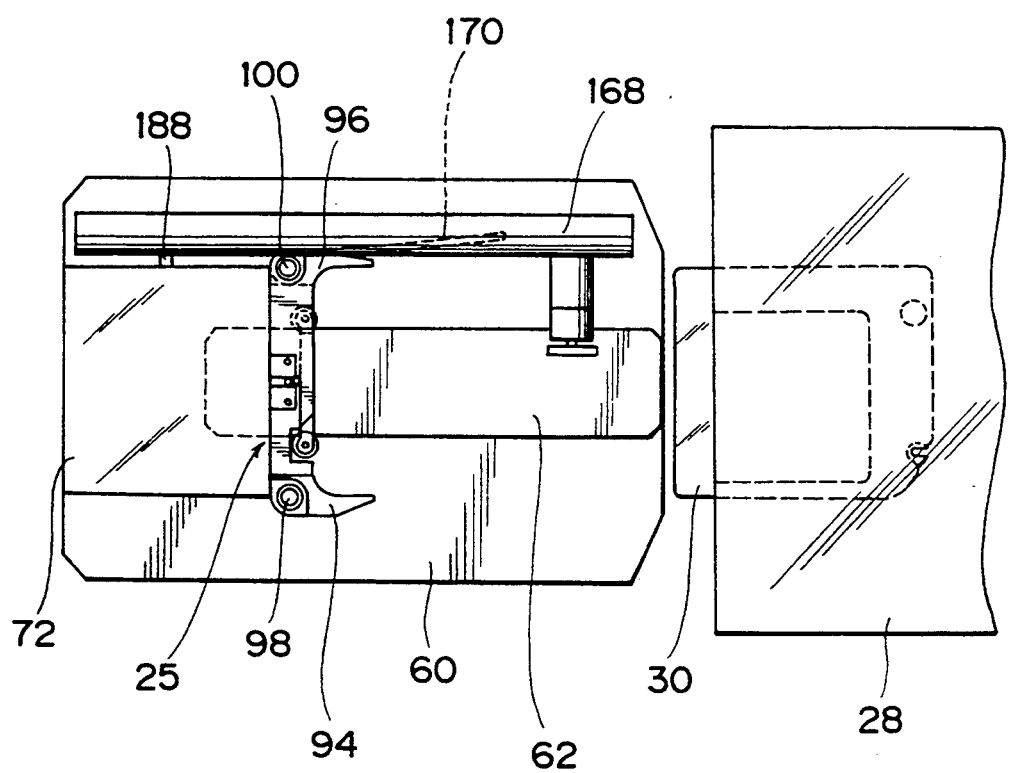
FIGS. 33A, 34A and 35A, and FIGS. 33B, 34B and 35B are plan views illustrating an operation of receiving the cartridge from the magnetic tape drive unit, and schematic elevational views taken from the magnetic tape drive unit, respectively.

First, as shown in FIG. 33A, the mechanical hand 26' is moved to a position near the magnetic tape cartridge 30 ejected from the magnetic tape drive unit 28. As the roller 190 mounted at the end of the pin 188 is inserted in the cam groove 180, the movement of the hand unit 72 causes the rotation of the cam shaft 168 in the directions R shown in FIG. 30. In the retracted position of the hand unit 72 as shown in FIGS. 33A and 33B, the cartridge presser mechanism 174 is lowered to a press position.

Figure 33B:
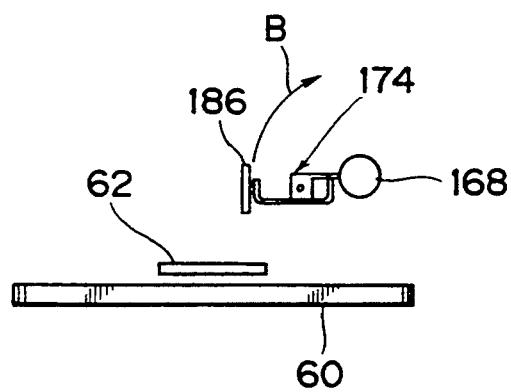
Figure 34A:
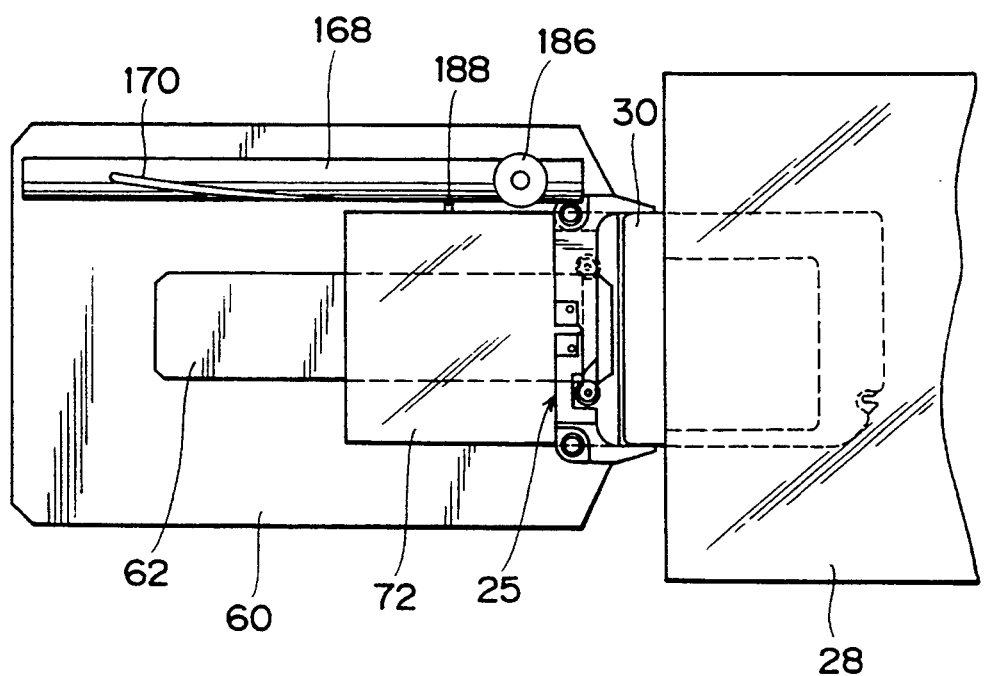
Figure 34B:
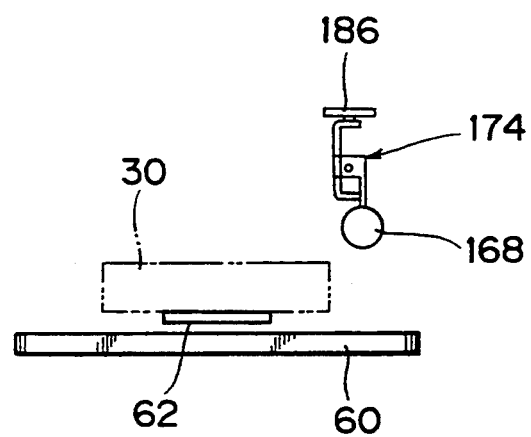
Figure 35A:
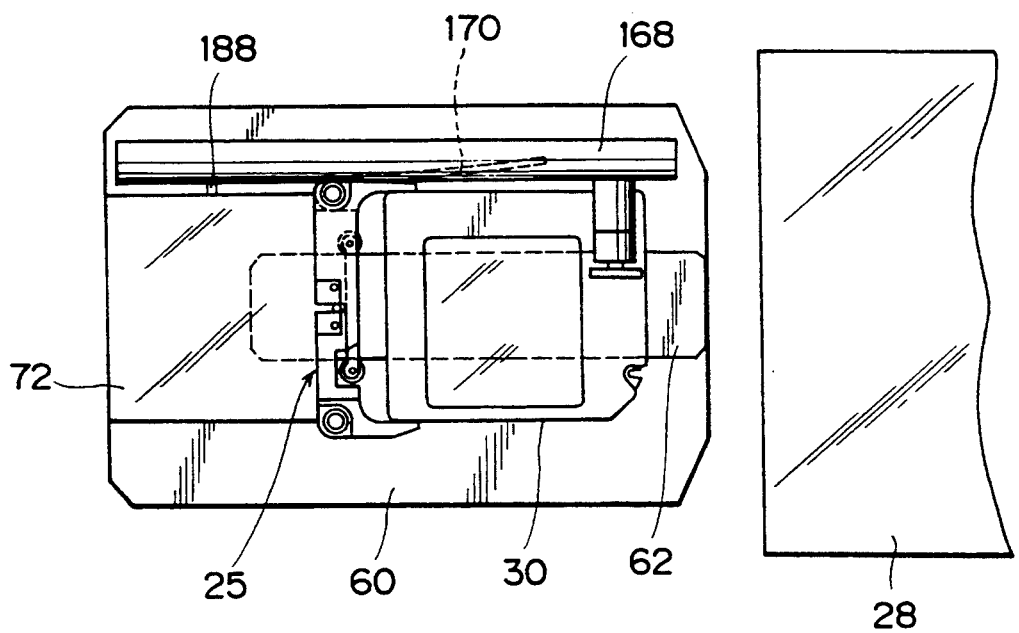
Figure 35B:
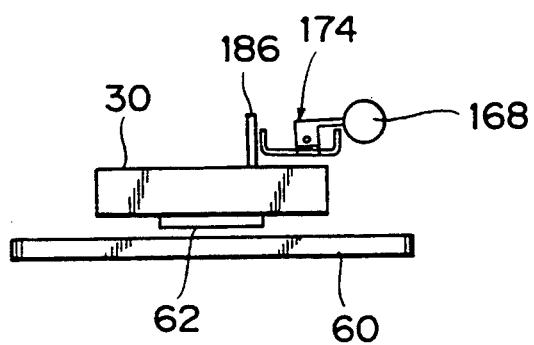

When the hand unit 72 is advanced from the retracted position shown in FIG. 33A to the advanced position shown in FIG. 34A, the cam shaft 168 and the cartridge presser mechanism 174 are rotated in a direction depicted by an arrow B in FIG. 33B in concert with the advance of the hand unit 72. In the advanced position of the hand unit 72, the cartridge presser mechanism 174 is raised as shown in FIG. 34B. In this raised condition, the cartridge 30 is gripped by the grip hand 25, and the hand unit 72 is then moved to the retracted position shown in FIG. 35A. During the retraction of the hand unit 72, the cam shaft 168 is rotated in a direction reverse to the direction B, and in the retracted position of the hand unit 72 shown in FIG. 35A where the cartridge 30 is received in a predetermined position of the mechanical hand 26' the upper surface of the cartridge 30 is pressed by the roller 186 of the cartridge presser mechanism 174.

Figure 18B:
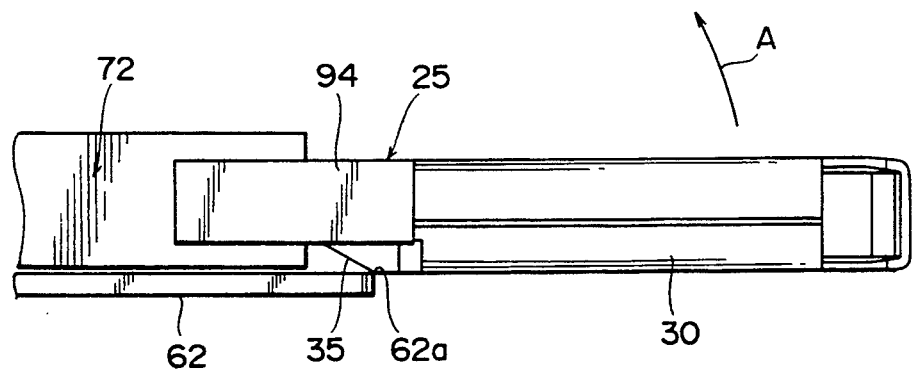
Figure 18C:
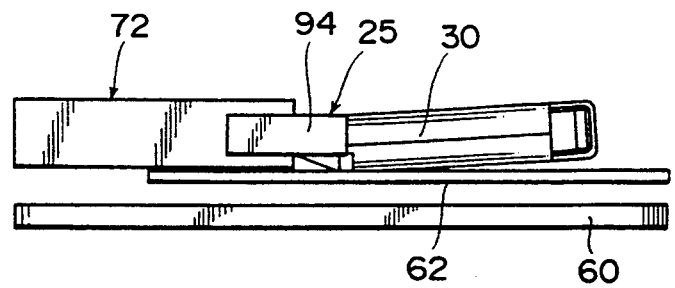

Accordingly, even when the tapering portion 35 of the cartridge 30 comes into contact with the front edge 62a of the tray 62 to cause flying-of the cartridge 30 from the tray 62 as shown in FIGS. 18A to 18C, the cartridge 30 is pressed by the cartridge presser mechanism 174 in the condition where the cartridge 30 is fully received in the mechanical hand 26' thus correcting the flying condition of the cartridge 30. In general, the tapering portion 35 of the cartridge 30 is formed in consideration of convenience of handling.

While the present invention has been applied to a magnetic tape cartridge in the above description, the application of the present invention is not limited to the magnetic tape cartridge, but the present invention may be applied to any other cartridge type media such as an optical disk cartridge. Further, the cartridge received condition correcting mechanism mentioned above is merely illustrative, and any other cartridge presser mechanisms may be adopted. For example, the cartridge in the received condition may be positively pressed by using a sensor and an independent drive source such as a motor.

What is claimed is:

1. A mechanical hand of an accessor for automatically exchanging a recording medium cartridge between a cell unit having a plurality of cells, each cell being configured to accommodate a recording medium cartridge, and a recording medium drive unit for performing read/write of data from/to said recording medium cartridge, said mechanical hand comprising:

a base mounted swingably about a vertical axis;

gripping means mounted on said base for gripping said recording medium cartridge, said gripping means being movable between an advanced position and a retracted position and adapted to be opened and closed about a vertical axis;

first driving means for moving said gripping means along said base between said advanced position and said retracted position;

second driving means for opening and closing said gripping means;

a tray mounted on said base under said gripping means, said tray being movable between an advanced position projecting from said base and a non-projecting position; and third driving means for moving said tray along said base between said advanced position projecting from said base and said non-projecting position.

2. A mechanical hand according to claim 1, wherein said gripping means comprises a first L-shaped finger mounted pivotably about a vertical axis and a second L-shaped finger mounted pivotably about a vertical axis, said first L-shaped finger having one end formed with a cartridge gripping portion and having the other end formed with a cartridge pushing portion, said second L-shaped finger having one end formed with a cartridge gripping portion and having the other end formed with a cartridge pushing portion, said first and second L-shaped fingers being related in position so that said cartridge gripping portions form opposite outside portions of said gripping means.

3. A mechanical hand according to claim 2, wherein said second driving means comprises a motor, a first gear operatively connected to said motor, a second gear meshing with said first gear, first linkage means for operatively connecting said first gear to said first L-shaped finger, second linkage means for operatively connecting said second gear to said second L-shaped finger, and biasing means for normally biasing said first and second L-shaped fingers in a closing direction of said gripping means so that said cartridge is gripped by said gripping means.

4. A mechanical hand according to claim 3, wherein said biasing means comprises a coil spring operatively mounted to one of said first and second gears.

5. A mechanical hand according to claim 2, wherein said gripping means further comprises first and second rollers rotatably mounted at said cartridge pushing portions of said first and second L-shaped fingers, respectively.

6. A mechanical hand of an accessor for automatically exchanging a recording medium cartridge between a cell unit having a plurality of cells, each cell being configured to accommodate a recording medium cartridge, and a recording medium drive unit for performing read/write of data from/to said recording medium cartridge, said mechanical hand comprising:

a base mounted swingably about a vertical axis;

gripping means mounted on said base for gripping said recording medium cartridge, said gripping means being movable between an advanced position and a retracted position and adapted to be opened and closed about a vertical axis;

first driving means for moving said gripping means along said base between said advanced position and said retracted position;

second driving means for opening and closing said gripping means;

a tray mounted on said base under said gripping means, said tray being movable between an advanced position projecting from said base and a non-projecting position; and third driving means for moving said tray along said base between said advanced position projecting from said base and said non-projecting position;

a housing for accommodating said first and second driving means;

first positioning means mounted on said base for defining a reference position of said recording medium cartridge when said gripping means is moved to said retracted position gripping said cartridge;

second positioning means mounted on said base for elastically biasing said recording medium cartridge toward said first positioning means; and a block mounted on a side surface of said housing so as to extend in a moving direction of said gripping means, said block being adapted to contact said second positioning means during movement of said gripping means from said advanced position to said retracted position.

7. A mechanical hand according to claim 6, wherein said first positioning means comprises a pair of first rollers rotatably mounted in spaced relationship from each other in said moving direction of said gripping means.

8. A mechanical hand according to claim 7, wherein said second positioning means comprises a first arm pivotably mounted on said base, a second arm pivotably mounted on said base, a second roller rotatably mounted at one end of said first arm, a third roller rotatably mounted at one end of said second arm, connecting means for pivotably connecting the other end of said first arm to the other end of said second arm, and biasing means for biasing the other ends of said first and second arms away from said first positioning means.

9. A mechanical hand according to claim 8, wherein said second and third rollers contact said block in said advanced position of said gripping means, and contact a side surface of said cartridge when said gripping means is moved to said retracted position gripping said cartridge.

10. A mechanical hand according to claim 8, wherein said second positioning means further comprises a third arm pivotably mounted on said base, a fourth roller rotatably mounted at one end of said third arm, said fourth roller being adapted to contact said gripping means, and linkage means for operatively connecting the other end of said third arm to one of said first and second arms.

11. A mechanical hand of an accessor for automatically exchanging a recording medium cartridge between a cell unit having a plurality of cells, each cell being configured to accommodate recording medium cartridge, and a recording medium drive unit for performing read/write of data from/to said recording medium cartridge, said mechanical hand comprising:

a base mounted swingably about a vertical axis;

gripping means mounted on said base for gripping said recording medium cartridge, said gripping means being movable between an advanced position and a retracted position and adapted to be opened and closed about a vertical axis;

first driving means for moving said gripping means along said base between said advanced position and said retracted position;

second driving means for opening and closing said gripping means;

a tray mounted on said base under said gripping means, said tray being movable between an advanced position projecting from said base and a non-projecting position; and third driving means for moving said tray along said base between said advanced position projecting from said base and said non-projecting position.

cartridge gripped condition correcting means for pressing said recording medium cartridge against said tray when said gripping means is moved to said retracted position gripping said cartridge.

12. A mechanical hand according to claim 11, wherein said cartridge gripped condition correcting means comprises a shaft rotatably mounted to said base, said shaft having a spiral groove, a pin having one end fixed to said gripping means and the other end inserted in said spiral groove of said shaft, and cartridge presser means fixed to said shaft.

13. A mechanical hand according to claim 12, wherein said spiral groove has a form such that said cartridge presser means contacts said cartridge in said retracted position of said gripping means gripping said cartridge, and separates from said cartridge when said gripping means is moved to said advanced position.

14. A mechanical hand according to claim 13, wherein said cartridge presser means comprises a bracket fixed to said shaft and a first roller rotatably mounted to said bracket.

15. A mechanical hand according to claim 14, wherein said cartridge presser means further comprises means for elastically pressing said first roller against an upper surface of said cartridge.

16. A mechanical hand according to claim 12, wherein said cartridge gripped condition correcting means further comprises a second roller rotatably mounted at the other end of said pin, said second roller being inserted in said spiral groove of said shaft.

* * * * *